United States Patent
Dutta et al.

(10) Patent No.: US 11,792,880 B2
(45) Date of Patent: Oct. 17, 2023

(54) DISCONTINUOUS RECEPTION MECHANISM FOR SIDELINK

(71) Applicant: QUALCOMM Incorporated, San Diego, CA (US)

(72) Inventors: Sourjya Dutta, San Diego, CA (US); Shuanshuan Wu, San Diego, CA (US); Kapil Gulati, Belle Mead, NJ (US)

(73) Assignee: QUALCOMM Incorporated, San Diego, CA (US)

(*) Notice: Subject to any disclaimer, the term of this patent is extended or adjusted under 35 U.S.C. 154(b) by 92 days.

(21) Appl. No.: 17/308,802

(22) Filed: May 5, 2021

(65) Prior Publication Data
US 2021/0352758 A1 Nov. 11, 2021

Related U.S. Application Data

(60) Provisional application No. 63/021,261, filed on May 7, 2020.

(51) Int. Cl.
*H04W 76/28* (2018.01)
*H04W 72/044* (2023.01)

(52) U.S. Cl.
CPC ......... *H04W 76/28* (2018.02); *H04W 72/044* (2013.01)

(58) Field of Classification Search
None
See application file for complete search history.

(56) References Cited

U.S. PATENT DOCUMENTS

| | | | |
|---|---|---|---|
| 2011/0258327 A1* | 10/2011 | Phan | H04W 16/10 709/227 |
| 2013/0150018 A1* | 6/2013 | Su | H04W 68/12 455/419 |

(Continued)

FOREIGN PATENT DOCUMENTS

| | | | |
|---|---|---|---|
| EP | 2850886 B1 * | 11/2017 | H04L 29/06 |
| KR | 20150100205 A * | 9/2015 | H04W 52/0229 |

(Continued)

OTHER PUBLICATIONS

Huawei, et al., "Beamforming for V2X Sidelink for FR1 and FR2", 3GPP Draft, 3GPP TSG RAN WG1 Meeting #96, R1-1903075, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600771, 4 Pages, Retrieved from the Internet: URL: http://www.3gpp.org/ftp/tsg%5Fran/WG1%5FRL1/TSGR1%5F96/Docs/R1%2D1903075%2Ezip [retrieved on Feb. 15, 2019] p. 1, line 1-p. 3, line 13.

(Continued)

*Primary Examiner* — Jamaal Henson
(74) *Attorney, Agent, or Firm* — Holland & Hart LLP

(57) ABSTRACT

Methods, systems, and devices for wireless communications are described. The method includes receiving, from a second UE, a discontinuous transmission configuration for a sidelink connection between the first UE and the second UE, determining, based on the received discontinuous transmission configuration, a set of receive beams for discontinuous reception by the first UE for the sidelink connection, and transmitting, to the second UE, a discontinuous reception configuration that indicates the determined set of receive beams for discontinuous reception for the sidelink connection.

30 Claims, 13 Drawing Sheets

(56) References Cited

U.S. PATENT DOCUMENTS

| | | | | |
|---|---|---|---|---|
| 2016/0088681 A1* | 3/2016 | Chang | ............... | H04W 52/0216 |
| | | | | 455/405 |
| 2016/0366645 A1* | 12/2016 | Song | ................. | H04W 52/0229 |
| 2021/0076448 A1* | 3/2021 | Koskela | ............... | H04B 7/0695 |
| 2021/0267008 A1 | 8/2021 | Dutta et al. | | |
| 2022/0232667 A1* | 7/2022 | Back | ..................... | H04W 76/28 |

FOREIGN PATENT DOCUMENTS

| | | | | | |
|---|---|---|---|---|---|
| WO | WO-2018064477 A1 | | 4/2018 | | |
| WO | WO-2021003693 A1 | * | 1/2021 | .............. | H04W 4/40 |
| WO | WO-2021119474 A1 | * | 6/2021 | ........ | H04W 72/0406 |

OTHER PUBLICATIONS

International Search Report and Written Opinion—PCT/US2021/031161—ISA/EPO—dated Aug. 12, 2021.

\* cited by examiner

DISCONTINUOUS RECEPTION MECHANISM FOR SIDELINK

CROSS REFERENCE

The present Application for Patent claims the benefit of U.S. Provisional Patent Application No. 63/021,261 by DUTTA et al., entitled "DISCONTINUOUS RECEPTION MECHANISM FOR SIDELINK," filed May 7, 2020, assigned to the assignee hereof, and expressly incorporated by reference herein.

FIELD OF TECHNOLOGY

The following relates generally to wireless communications and more specifically to discontinuous reception mechanisms for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support sidelink communications between multiple communication devices. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, cellular V2X (C-V2X) communications systems, and the like. As demand for communication efficiency increases, it may be desirable for some wireless communications systems, such as 4G and 5G systems, to provide improvements to sidelink communications to support higher reliability and low latency sidelink operations, among other examples.

SUMMARY

The described techniques relate to improved methods, systems, devices, and apparatuses that support discontinuous reception mechanisms for sidelink communications. Generally, the described techniques provide for a receiver UE to send a DRX notification to a peer UE (e.g., transmitter UE) that include the beam directions over which the receiver UE listens over each DRX period. The transmitter UE may attempt to send control or data, or both, using a beam that is aligned to one of the beams indicated in the DRX notification.

A method of wireless communications at a first UE is described. The method may include receiving, from a second UE, a discontinuous transmission configuration for a sidelink connection between the first UE and the second UE, determining, based on the received discontinuous transmission configuration, a set of receive beams for discontinuous reception by the first UE for the sidelink connection, and transmitting, to the second UE, a discontinuous reception configuration that indicates the determined set of receive beams for discontinuous reception for the sidelink connection.

An apparatus for wireless communications at a first UE is described. The apparatus may include a processor, memory coupled with the processor, and instructions stored in the memory. The instructions may be executable by the processor to cause the apparatus to receive, from a second UE, a discontinuous transmission configuration for a sidelink connection between the first UE and the second UE, determine, based on the received discontinuous transmission configuration, a set of receive beams for discontinuous reception by the first UE for the sidelink connection, and transmit, to the second UE, a discontinuous reception configuration that indicates the determined set of receive beams for discontinuous reception for the sidelink connection.

Another apparatus for wireless communications at a first UE is described. The apparatus may include means for receiving, from a second UE, a discontinuous transmission configuration for a sidelink connection between the first UE and the second UE, determining, based on the received discontinuous transmission configuration, a set of receive beams for discontinuous reception by the first UE for the sidelink connection, and transmitting, to the second UE, a discontinuous reception configuration that indicates the determined set of receive beams for discontinuous reception for the sidelink connection.

A non-transitory computer-readable medium storing code for wireless communications at a first UE is described. The code may include instructions executable by a processor to receive, from a second UE, a discontinuous transmission configuration for a sidelink connection between the first UE and the second UE, determine, based on the received discontinuous transmission configuration, a set of receive beams for discontinuous reception by the first UE for the sidelink connection, and transmit, to the second UE, a discontinuous reception configuration that indicates the determined set of receive beams for discontinuous reception for the sidelink connection.

In some examples of the method, apparatuses, and non-transitory computer-readable medium described herein, transmitting the discontinuous reception configuration further may include operations, features, means, or instructions for transmitting an indication of at least one beam of the set of receive beams.

In some examples of the method, apparatuses, and non-transitory computer-readable medium described herein, transmitting the discontinuous reception configuration further may include operations, features, means, or instructions for transmitting an indication of time resources, or frequency resources, or both, corresponding to one or more receive beams of the set of receive beams.

In some examples of the method, apparatuses, and non-transitory computer-readable medium described herein, transmitting the indication of the time resources, or the frequency resources, or both may include operations, features, means, or instructions for transmitting, for a set of cycles of the discontinuous reception, the indication of time resources during which the first UE may be to receive using each respective receive beam of the set of receive beams.

Some examples of the method, apparatuses, and non-transitory computer-readable medium described herein may further include operations, features, means, or instructions for attempting to receive, on the determined set of receive beams over a respective set of occasions during a cycle of the discontinuous reception, a transmission from the second UE, and receiving, on a receive beam of the set of receive beams, the transmission from the second UE during one of the set of occasions corresponding to the receive beam.

In some examples of the method, apparatuses, and non-transitory computer-readable medium described herein, the discontinuous reception configuration may be transmitted to the second UE during a discontinuous transmission occasion indicated in the received discontinuous transmission configuration.

In some examples of the method, apparatuses, and non-transitory computer-readable medium described herein, the discontinuous reception configuration may be transmitted to the second UE during a discontinuous reception on duration of the second UE.

Some examples of the method, apparatuses, and non-transitory computer-readable medium described herein may further include operations, features, means, or instructions for transmitting, to the second UE, a set of discontinuous reception configurations, including the discontinuous reception configuration, where each of the set of discontinuous reception configurations includes a receive beam configuration that the first UE may be to use during a single discontinuous reception on duration of the second UE.

Some examples of the method, apparatuses, and non-transitory computer-readable medium described herein may further include operations, features, means, or instructions for assigning, to the second UE, a first index that corresponds to a receive beam configuration of the discontinuous reception configuration, where the discontinuous reception configuration includes the receive beam configuration and the first assigned index.

Some examples of the method, apparatuses, and non-transitory computer-readable medium described herein may further include operations, features, means, or instructions for identifying a set of receive beams the first UE may be configured to form, and determining to receive transmissions from the second UE using a first receive beam and a second receive beam of the set of receive beams, where the receive beam configuration indicates the first receive beam and the second receive beam.

Some examples of the method, apparatuses, and non-transitory computer-readable medium described herein may further include operations, features, means, or instructions for identifying that the first receive beam may be preferred over the second receive beam, where the first assigned index corresponds to the first receive beam based on the first receive beam being preferred over the second receive beam.

In some examples of the method, apparatuses, and non-transitory computer-readable medium described herein, the first assigned index may be indicated for an entire discontinuous reception ON duration.

In some examples of the method, apparatuses, and non-transitory computer-readable medium described herein, the first assigned index may be indicated for a first duration of the discontinuous reception ON duration and a second index may be indicated for a second duration of the discontinuous reception ON duration, the second index to a second receive beam configuration of the discontinuous reception configuration.

Some examples of the method, apparatuses, and non-transitory computer-readable medium described herein may further include operations, features, means, or instructions for assigning, to the second UE, a second index that corresponds to a second receive beam configuration of the discontinuous reception configuration, where the discontinuous reception configuration includes the receive beam configuration, the first assigned index, and the second assigned index, and where the second UE may reestablish a connection with the first UE using the first assigned index or the second assigned index.

Some examples of the method, apparatuses, and non-transitory computer-readable medium described herein may further include operations, features, means, or instructions for indicating to the second UE that the second assigned index includes a degradation in quality of service in relation to the first assigned index.

In some examples of the method, apparatuses, and non-transitory computer-readable medium described herein, the discontinuous reception configuration includes an indication of a discontinuous reception period, or a frame offset, or a slot offset, or a discontinuous reception ON duration, or an index to a receive beam configuration of the discontinuous reception configuration that the first UE selects to use during the discontinuous reception ON duration, or a combination thereof.

Some examples of the method, apparatuses, and non-transitory computer-readable medium described herein may further include operations, features, means, or instructions for receiving, from the second UE over the sidelink connection, a first radio resource control connection reconfiguration message, where the first radio resource control connection reconfiguration message includes the discontinuous transmission configuration.

Some examples of the method, apparatuses, and non-transitory computer-readable medium described herein may further include operations, features, means, or instructions for transmitting, to the second UE, a second radio resource control connection reconfiguration message based on the first radio resource control connection reconfiguration message from the second UE.

Some examples of the method, apparatuses, and non-transitory computer-readable medium described herein may further include operations, features, means, or instructions for transmitting, to the second UE, a request to apply an offset to the discontinuous transmission configuration based on the first radio resource control connection reconfiguration message from the second UE.

A method of wireless communications at a second UE is described. The method may include transmitting, to a first UE, a discontinuous transmission configuration for a sidelink connection between the first UE and a second UE, receiving, from the first UE, a discontinuous reception configuration for the sidelink connection that indicates a set of receive beams for discontinuous reception by the first UE for the sidelink connection based on the transmitted discontinuous transmission configuration, and transmitting, to the first UE using the sidelink connection, signaling according to the transmitted discontinuous transmission configuration and based on the received discontinuous reception configuration.

An apparatus for wireless communications at a second UE is described. The apparatus may include a processor, memory coupled with the processor, and instructions stored in the memory. The instructions may be executable by the processor to cause the apparatus to transmit, to a first UE, a discontinuous transmission configuration for a sidelink connection between the first UE and a second UE, receive, from the first UE, a discontinuous reception configuration for the sidelink connection that indicates a set of receive beams for discontinuous reception by the first UE for the sidelink connection based on the transmitted discontinuous transmission configuration, and transmit, to the first UE using the sidelink connection, signaling according to the transmitted discontinuous transmission configuration and based on the received discontinuous reception configuration.

Another apparatus for wireless communications at a second UE is described. The apparatus may include means for transmitting, to a first UE, a discontinuous transmission configuration for a sidelink connection between the first UE and a second UE, receiving, from the first UE, a discontinuous reception configuration for the sidelink connection that indicates a set of receive beams for discontinuous reception by the first UE for the sidelink connection based on the transmitted discontinuous transmission configuration, and transmitting, to the first UE using the sidelink connection, signaling according to the transmitted discontinuous transmission configuration and based on the received discontinuous reception configuration.

A non-transitory computer-readable medium storing code for wireless communications at a second UE is described. The code may include instructions executable by a processor to transmit, to a first UE, a discontinuous transmission configuration for a sidelink connection between the first UE and a second UE, receive, from the first UE, a discontinuous reception configuration for the sidelink connection that indicates a set of receive beams for discontinuous reception by the first UE for the sidelink connection based on the transmitted discontinuous transmission configuration, and transmit, to the first UE using the sidelink connection, signaling according to the transmitted discontinuous transmission configuration and based on the received discontinuous reception configuration.

Some examples of the method, apparatuses, and non-transitory computer-readable medium described herein may further include operations, features, means, or instructions for identifying a transmission beam of the second UE corresponding to a receive beam of the first UE that may be indicated in the discontinuous reception configuration, the signaling transmitted on the identified transmission beam.

Some examples of the method, apparatuses, and non-transitory computer-readable medium described herein may further include operations, features, means, or instructions for determining, from the discontinuous reception configuration, time resources, or frequency resources, or both, corresponding to one or more receive beams of the set of receive beams.

In some examples of the method, apparatuses, and non-transitory computer-readable medium described herein, the discontinuous reception configuration may be received during a discontinuous transmission occasion indicated in the transmitted discontinuous transmission configuration.

In some examples of the method, apparatuses, and non-transitory computer-readable medium described herein, the discontinuous reception configuration may be received during a discontinuous reception on duration of the second UE.

Some examples of the method, apparatuses, and non-transitory computer-readable medium described herein may further include operations, features, means, or instructions for receiving, from the first UE, a set of discontinuous reception configurations, including the discontinuous reception configuration, where each of the set of discontinuous reception configurations includes a receive beam configuration that the first UE may be to use during a single discontinuous reception on duration of the second UE.

Some examples of the method, apparatuses, and non-transitory computer-readable medium described herein may further include operations, features, means, or instructions for receiving, from the first UE, a first index that corresponds to the receive beam configuration of the discontinuous reception configuration, where the discontinuous reception configuration includes the receive beam configuration and the first assigned index.

Some examples of the method, apparatuses, and non-transitory computer-readable medium described herein may further include operations, features, means, or instructions for receiving, from the first UE, a second index that corresponds to a second receive beam configuration of the discontinuous reception configuration.

Some examples of the method, apparatuses, and non-transitory computer-readable medium described herein may further include operations, features, means, or instructions for reestablishing a connection with the first UE using the first received index or the second received index.

Some examples of the method, apparatuses, and non-transitory computer-readable medium described herein may further include operations, features, means, or instructions for determining the second received index includes a degradation in quality of service in relation to the first received index, and increasing a transmission power or downgrading a modulation and coding scheme, or both, when using the second received index to transmit a signal to the first UE.

Some examples of the method, apparatuses, and non-transitory computer-readable medium described herein may further include operations, features, means, or instructions for transmitting a first instance of a message in a first beam direction indicated in the discontinuous reception configuration, transmitting a second instance of the message in a second beam direction indicated in the discontinuous reception configuration based on receiving negative feedback or not receiving feedback for the first instance, receiving positive feedback for the message, and bypassing transmitting a third instance of the message in a third beam direction based on receiving the positive feedback.

Some examples of the method, apparatuses, and non-transitory computer-readable medium described herein may further include operations, features, means, or instructions for transmitting, to the first UE using the sidelink connection, a first radio resource control connection reconfiguration message, where the first radio resource control connection reconfiguration message includes the discontinuous transmission configuration.

Some examples of the method, apparatuses, and non-transitory computer-readable medium described herein may further include operations, features, means, or instructions for receiving, from the first UE, a second radio resource control connection reconfiguration message based on the transmitting of the first radio resource control connection reconfiguration message to the first UE.

Some examples of the method, apparatuses, and non-transitory computer-readable medium described herein may further include operations, features, means, or instructions for receiving, from the first UE, a request to apply an offset to the discontinuous transmission configuration based on the transmitting of the first radio resource control connection reconfiguration message to the first UE.

Some examples of the method, apparatuses, and non-transitory computer-readable medium described herein may further include operations, features, means, or instructions for transmitting a data packet to the first UE using the sidelink connection, receiving, from the first UE, acknowledgment feedback indicating a negative acknowledgement or no acknowledgement, retransmitting, based on the received acknowledgement feedback, the data packet to the first UE using the sidelink connection, and receiving a radio resource control connection reconfiguration message from the first UE at least in part in response to the retransmission of the data packet.

Some examples of the method, apparatuses, and non-transitory computer-readable medium described herein may further include operations, features, means, or instructions for transmitting, to the first UE using the sidelink connection, a first radio resource control connection reconfiguration message and at least a portion of a data packet, and receiving a second radio resource control connection reconfiguration message from the first UE based on the first radio resource control connection reconfiguration message or the at least a portion of the data packet.

The foregoing has outlined rather broadly the features and technical advantages of examples according to the disclosure in order that the detailed description that follows may be better understood. Additional features and advantages are described hereinafter. The conception and examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages are better understood from the following description when considered in connection with the accompanying figures. Each of the figures is provided for the purposes of illustration and description, and not as a definition of the limits of the claims.

While aspects and embodiments are described in this application by illustration to some examples, those skilled in the art understand that additional implementations and use cases may come about in many different arrangements and scenarios. Techniques described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
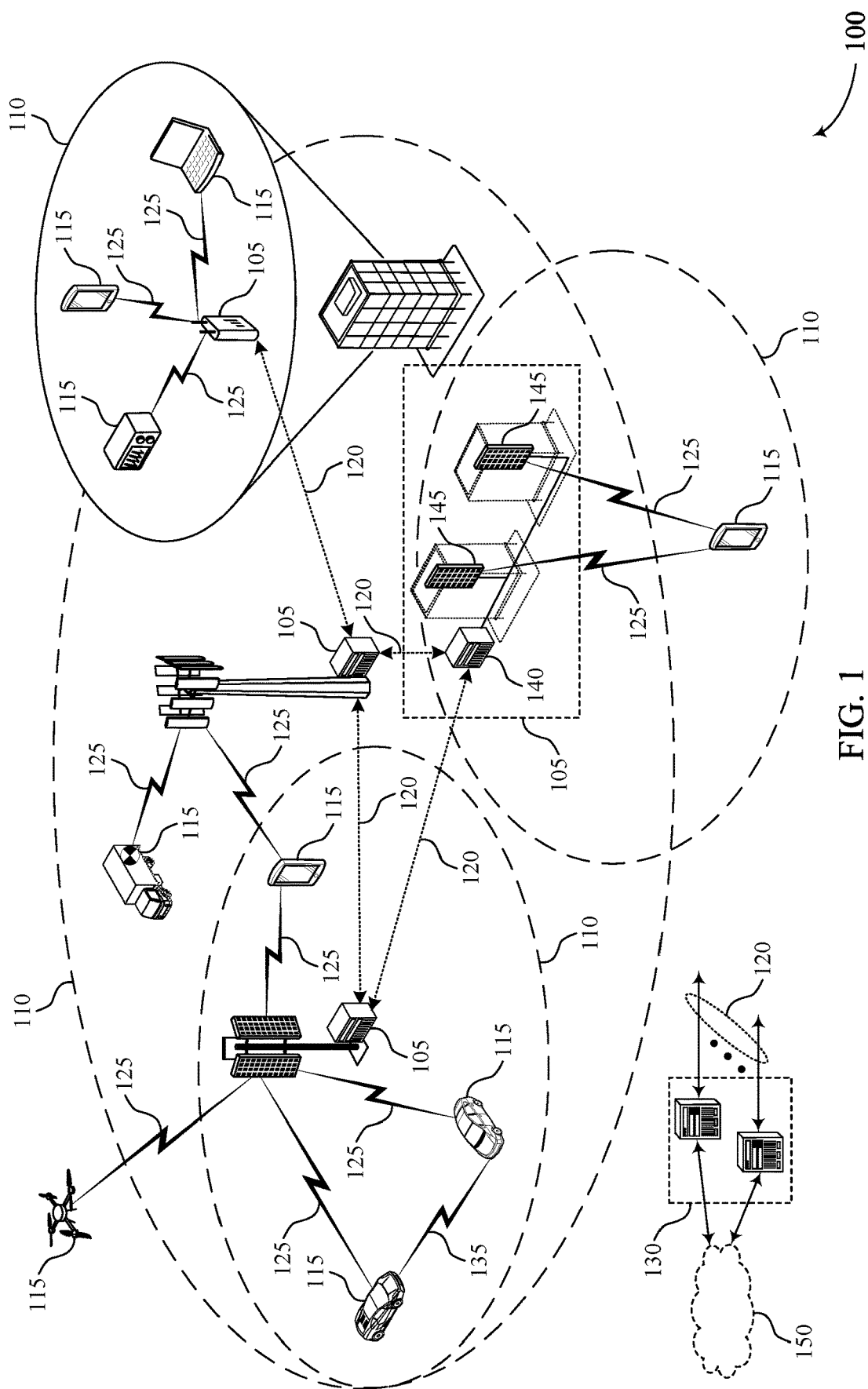
FIG. 1 illustrates an example of a system for wireless communications that supports discontinuous reception mechanisms for sidelink communications in accordance with aspects of the present disclosure.

Wireless communications systems may include multiple communication devices such as UEs and base stations, which may provide wireless communication services to the UEs. For example, such base stations may be next-generation NodeBs or giga-NodeBs (either of which may be referred to as a gNB) that may support multiple radio access technologies including 4G systems, such as LTE systems, as well as 5G systems, which may be referred to as NR systems. Some wireless communications systems may also support sidelink communications between multiple UEs. Examples of sidelink communications may include, but are not limited to, D2D communications, vehicle-based communications, which may also be referred to as vehicle-to-everything (V2X) communications systems, vehicle-to-vehicle (V2V) communications systems, cellular V2X (C-V2X) communications systems, etc. As demand for communication efficiency, reliability and latency increases, it may be desirable for wireless communications systems to provide improvements to sidelink communications to support higher reliability and low latency sidelink operations, among other examples.

A UE may establish a sidelink connection with one or multiple other UEs in a wireless communications system, for example, such as a V2X communications system. In some examples, the UE may support unicast communications, broadcast communications, or groupcast communications, or a combination thereof. To provide improvements to sidelink communications (e.g., energy efficiency, power savings, etc.), the UE may be configured to support DTX operations or DRX operations, or both. For example, a UE may be configured with (e.g., receive or determine) a DTX configuration, or may be configured with (e.g., receive or determine) a DRX configuration, or both. In some examples of unicast communications, a UE (e.g., a receiver UE) may receive a DTX configuration from another UE (e.g., a transmitter UE) via a connection (e.g., a sidelink connection), and the DTX configuration may identify a pattern of DTX cycles associated with (e.g., specific for) the UE (e.g., the receiver UE). A DTX cycle may include an active DTX duration, an inactive DTX duration, etc. as described herein. In some examples of broadcast communications and groupcast communications, a UE (e.g., a transmitter UE) may broadcast or transmit a DTX configuration to all UEs or a group of UEs over multiple connections (e.g., multiple sidelink connections). The DTX configuration may thus be common for all the UEs or the group of UEs. That is, the DTX configuration may be the same for all the UEs or the group of UEs, while each of the UEs may, in some examples, have different unicast traffic on a corresponding sidelink connection.

As part of DRX operations, the UE may determine a DRX configuration based on one or multiple received DTX configurations. The DRX configuration may indicate one or more DRX cycles, which may include an active DRX duration, an inactive DRX duration, etc. as described herein. Similarly, in some examples of unicast communications, the UE may transmit the DRX configuration to another UE via a connection (e.g., a sidelink connection), and the DRX configuration may identify a pattern of DRX cycles associated with (e.g., specific for) the UE. In some examples of broadcast communications and groupcast communications, the UE may transmit or broadcast the DRX configuration to all UEs or a group of UEs over multiple connections (e.g., multiple sidelink connections). The DRX configuration may thus be common for all the UEs or the group of UEs. Therefore, for sidelink communications, the UEs may experience power savings as a result of providing a DTX configuration or a DRX configuration, or both.

Particular aspects of the subject matter described in this disclosure may be implemented to realize one or more of the following potential improvements, among others. The techniques employed by UEs may provide benefits and enhancements to the operation of the UEs. For example, operations performed by the UEs may provide improvements to sidelink operations. In some examples, configuring the UEs to support DTX configurations or DRX configurations, or both, for sidelink communications may support improvements to latency (e.g., decreased latency), power consumption, spectral efficiency, and, in some examples, may promote enhanced efficiency for sidelink operations, among other benefits.

Aspects of the disclosure are initially described in the context of wireless communications systems. Aspects of the disclosure are then illustrated by and described with reference to transmission timelines that relate to DTX and DRX configurations for sidelink communications. Aspects of the disclosure are further illustrated by and described with reference to apparatus diagrams, system diagrams, and flowcharts that relate to DTX and DRX configurations for sidelink communications.

Aspects of the disclosure are initially described in the context of wireless communications systems. Aspects of the disclosure are further illustrated by and described with reference to transmission timelines. Aspects of the disclosure are further illustrated by and described with reference to apparatus diagrams, system diagrams, and flowcharts that relate to discontinuous reception mechanisms for sidelink communications.

FIG. 1 illustrates an example of a wireless communications system 100 that supports discontinuous reception mechanisms for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a UE 115 (e.g., specific UE 115).

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in which may include the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In the illustrated example, a first UE 115 may receive, from a second UE 115, a DTX configuration 210 for a sidelink connection between the first UE and the second UE. In some examples, first UE 115 may determine, based at least in part on the received DTX configuration 210, a set of receive beams for discontinuous reception by the first UE 115 for the sidelink connection 205. In some examples, first UE 115 may transmit, to the second UE 115, a DRX configuration 215 that indicates the determined set of receive beams for discontinuous reception for the sidelink connection 205. In some examples, first UE 115 may transmit in the DRX configuration an indication of at least one beam of the set of receive beams. In some examples, first UE 115 may transmit in the DRX configuration an indication of time resources, or frequency resources, or both, corresponding to one or more receive beams of the set of receive beams. In some examples, first UE 115 may transmit, for a set of cycles of the discontinuous reception, the indication of time resources during which first UE 115 is to receive using each respective receive beam of the set of receive beams. In some examples, first UE 115 may attempt to receive, on the determined set of receive beams over a respective set of occasions during a cycle of the discontinuous reception, a transmission from second UE 115. In some examples, first UE 115 may receive, on a receive beam of the set of receive beams, the transmission from the second UE 115 during one of the set of occasions corresponding to the receive beam.

Figure 2:
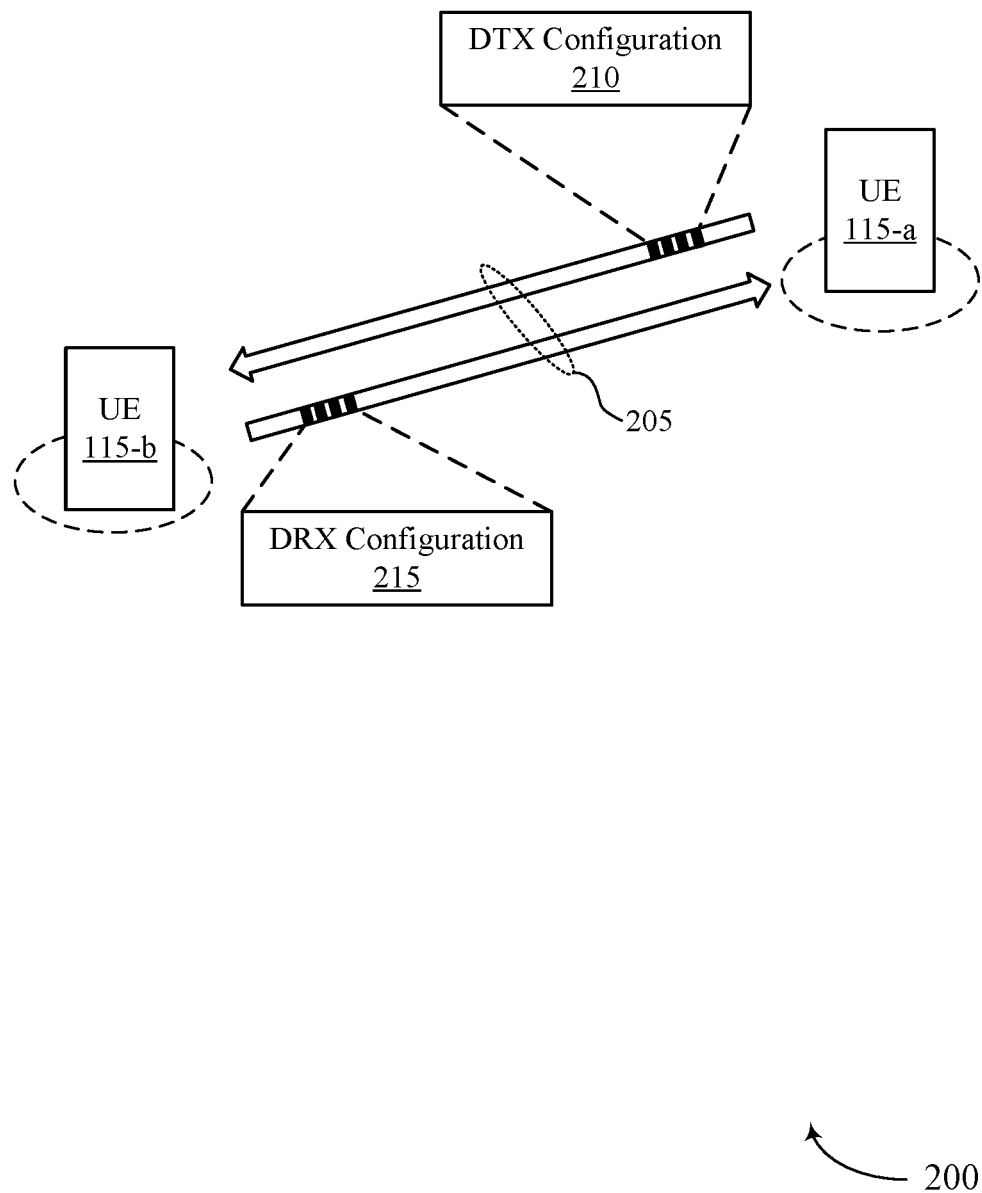
FIG. 2 illustrates an example of a wireless communications system that supports discontinuous reception mechanisms for sidelink communications in accordance with aspects of the present disclosure.

FIG. 2 illustrates an example of a wireless communications system 200 that supports discontinuous reception mechanisms for sidelink communications in accordance with aspects of the present disclosure. In some examples, wireless communications system 200 may implement aspects of wireless communication system 100. For example, the wireless communications system 200 may support multiple radio access technologies including 4G systems such as LTE systems, LTE-A systems, or LTE-A Pro systems, and 5G systems which may be referred to as NR systems. The wireless communications system 200 may also support sidelink communications between multiple UEs 115, such as between a UE 115-a and a UE 115-b, which may be examples of corresponding devices described with reference to FIG. 1. Examples of sidelink communications may include D2D communications, V2X communications systems, V2V communications systems, and the like. The wireless communications system 200 may also support improvements to power consumption and, in some examples, may promote high reliability and low latency sidelink communications, among other benefits.

The UE 115-a and the UE 115-b may be configured with multiple antennas, which may be used to employ techniques such as transmit diversity, receive diversity, multiple-input multiple-output communications, or beamforming, or any combination thereof. The antennas of the UE 115-a and the UE 115-b may be located within one or more antenna arrays or antenna panels, which may support multiple-input multiple-output operations or transmit or receive beamforming. The UE 115-a may have an antenna array with a number of rows and columns of antenna ports that the UE 115-a may use to support beamforming of communications (e.g., sidelink communications) with the UE 115-b or multiple other UEs. Likewise, the UE 115-b may have one or more antenna arrays that may support various multiple-input multiple-output or beamforming operations for communications (e.g., sidelink communications) with the UE 115-a or multiple other UEs. Additionally or alternatively, an antenna panel may support radio frequency beamforming for a signal transmitted via one or more antenna ports. The UE 115-a and the UE 115-b may thus be configured to support directional sidelink communications using the multiple antennas.

The UE 115-a or the UE 115-b, or both, in the wireless communications system 200, may support operations to decrease latency such as decreasing the latency associated with indicating a new data session for UE 115-b from UE 115-a during a DRX on period. In some examples, the UE 115-a or the UE 115-a, or both, in the wireless communications system 200, may support operations to preserve resources (for example, time and frequency resources of the wireless communications system 200), a battery life of the UE 115-a or the UE 115-b, or both, among other examples. In some examples, the UE 115-a or the UE 115-b, or both, may be configured to support operations to manage or improve sidelink communications for a sidelink connection 205 between the UE 115-a and the UE 115-b. For example, the UE 115-a or the UE 115-b, or both, may be configured to support DTX operations or DRX operations, or both for sidelink communications for the sidelink connection 205.

The sidelink connection 205 may be an example of a communication channel, such as a sidelink communication channel, between vehicles (e.g., UEs 115). The sidelink communication channel may correspond to a PC5 interface between the UE 115-a and the UE 115-b. The PC5 interface may facilitate direct communications between at least two UEs without involving a network infrastructure (e.g., a base station (e.g., an eNB, a next-generation NodeB or giga-NodeB (either of which may be referred to as a gNB), and the like). The PC5 interface may also be a one-to-many communication interface (i.e., may be specified for group communications).

In some examples, the UE 115-a and the UE 115-b may perform a connection procedure (e.g., a sidelink connection procedure) to establish the sidelink connection 205. For example, the UE 115-a and the UE 115-b may perform a sidelink connection setup procedure to establish the sidelink connection 205. As part of the sidelink connection procedure, the UE 115-a may determine a DTX configuration 210 for the sidelink connection 205, and the DTX configuration 210 may be for (e.g., exclusively for, specific to) the sidelink connection 205. In some other examples, the UE 115-a may determine the DTX configuration 210 prior to the sidelink connection procedure. The DTX configuration 210 may indicate a pattern of one or more DTX cycles, which may include a timing offset (e.g., a slot offset, a frame offset), a periodicity of the one or more DTX cycles, active DTX durations, or inactive DTX durations, or any combination thereof.

In some example, the UE 115-a may determine one or more of the timing offset (e.g., a slot offset, a frame offset), the periodicity of the one or more DTX cycles, the active DTX durations, or the inactive DTX durations, or any combination thereof, based in part on expected data traffic (e.g., a traffic load) on the sidelink connection 205. For example, the UE 115-a may determine one or more of the timing offset (e.g., a slot offset, a frame offset), the periodicity of the one or more DTX cycles, the active DTX durations, or the inactive DTX durations, or any combination thereof, based in part on a DRB configuration including a mapping and quasi-co-location indicator (PQI). The UE 115-a may provide the DTX configuration 210 to the UE 115-b as part of the sidelink connection procedure. In some examples, the sidelink connection setup procedure may be an RRC sidelink connection setup procedure, and the UE 115-a may provide the DTX configuration 210 in an RRC configuration message.

The UE 115-b may receive, the DTX configuration 210, from the UE 115-a as part of the sidelink connection procedure. In some examples, the UE 115-b may determine a DRX configuration 215 for the sidelink connection 205 based in part on the DTX configuration 210. The DRX configuration 215 may be exclusively for the sidelink connection 205. In some examples, the DRX configuration 215 may indicate a pattern of one or more DRX cycles, which may include a timing offset (e.g., a slot offset, a frame offset), a periodicity of the one or more DRX cycles, active DRX durations, or inactive DRX durations, or any combination thereof. As such, the UE 115-b (e.g., a receiver UE) may derive one or more DRX cycles based on the DTX configuration 210 from the UE 115-a (e.g., a transmitter UE). The UE 115-b may provide the DRX configuration 215 to the UE 115-a as part of the sidelink connection procedure. In some examples, the sidelink connection setup procedure may be an RRC sidelink connection setup procedure, and the UE 115-b may provide the DRX configuration 215 in an RRC configuration message.

In the illustrated example, the DTX configuration 210 and the DRX configuration 215 may be separate. Additionally, or alternatively, the DTX configuration 210 and the DRX configuration 215 may be specific for a given sidelink connection, such as the sidelink connection 205 (e.g., a sideline connection between a particular set of UEs, such as UE 115-a and 115-b). In some examples, a UE participating in multiple sidelink connections with multiple UEs (also referred to as peer UEs) may have separate DTX and DRX configurations (e.g., a separate DTX configuration and a separate DRX configuration) specific for each sidelink connection of the multiple sidelink connections the UE has with each UE of the multiple UEs.

In some examples, communication over sidelink connection 205 may occur within some frequency range (e.g., frequency range 2, millimeter wave bands between 24.25 to 52.6 GHz, etc.). In the illustrated example, UE 115-b may receive, from UE 115-a, a DTX configuration 210 for a sidelink connection between the first UE and the second UE. In some examples, UE 115-a may determine, based at least in part on the received DTX configuration 210, a set of receive beams for discontinuous reception by the UE 115-a for the sidelink connection 205. In some examples, UE 115-a may transmit, to the UE 115-b, a DRX configuration 215 that indicates the determined set of receive beams for discontinuous reception for the sidelink connection 205. In some examples, UE 115-a may transmit in the DRX configuration an indication of at least one beam of the set of receive beams. In some examples, UE 115-a may transmit in the DRX configuration an indication of time resources, or frequency resources, or both, corresponding to one or more receive beams of the set of receive beams. In some examples, UE 115-a may transmit, for a set of cycles of the discontinuous reception, the indication of time resources during which UE 115-a is to receive using each respective receive beam of the set of receive beams. In some examples, UE 115-a may attempt to receive, on the determined set of receive beams over a respective set of occasions during a cycle of the discontinuous reception, a transmission from UE 115-b. In some examples, UE 115-a may receive, on a receive beam of the set of receive beams, the transmission from the UE 115-b during one of the set of occasions corresponding to the receive beam.

By supporting one or more of the DTX configuration 210 or the DRX configuration 215, or both, for sidelink communications associated with the sidelink connection 205 the UE 115-a and the UE 115-b may experience power savings, among other benefits. In the example of FIG. 2, the sidelink connection procedure may be a unicast RRC sidelink connection setup procedure. As such, exchange of the DTX configuration 210 and the DRX configuration 215 may be performed via unicast communications.

Figure 3:
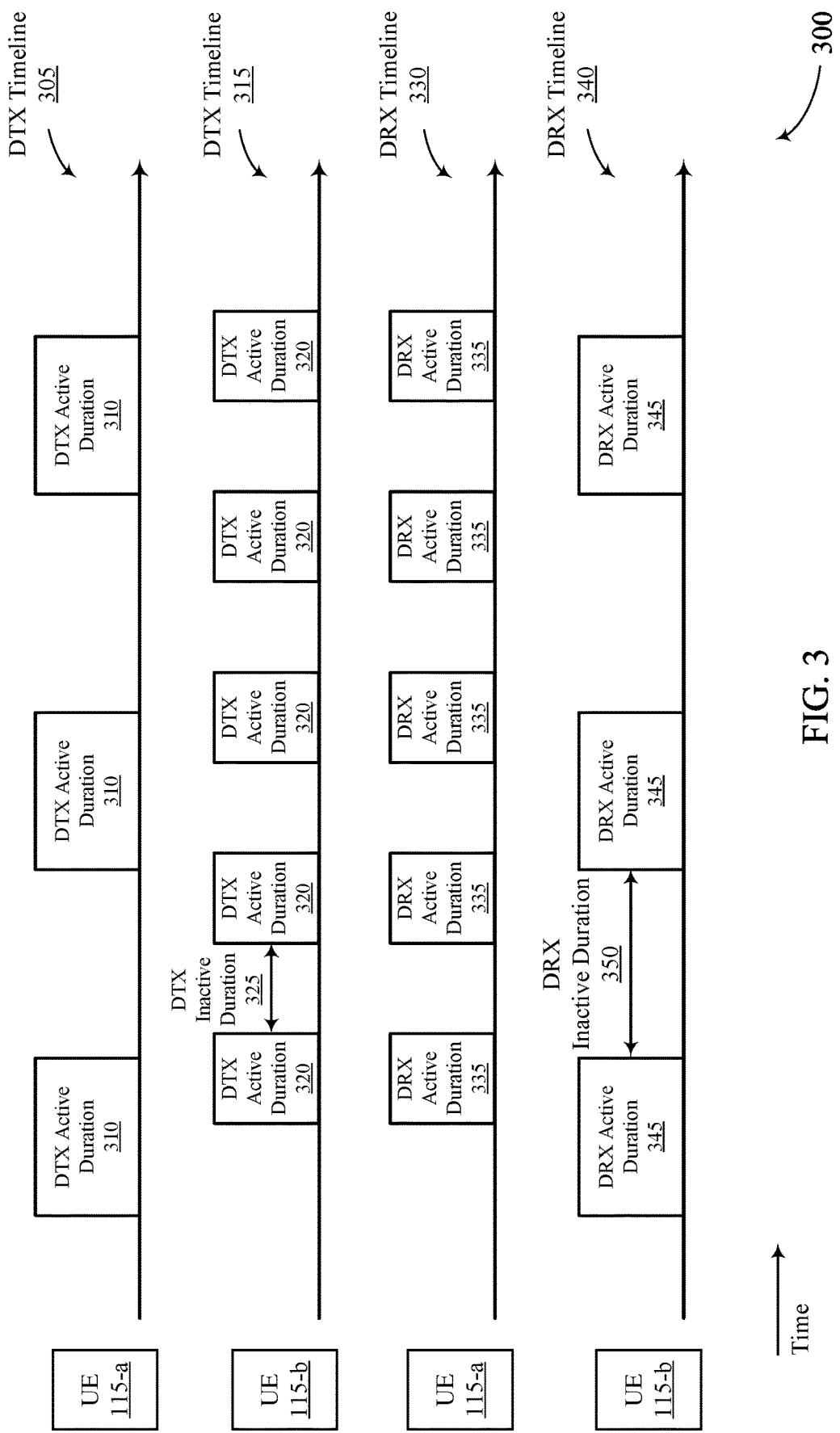
FIG. 3 illustrates an example of a transmission timelines that supports discontinuous reception mechanisms for sidelink communications in accordance with aspects of the present disclosure.

FIG. 3 illustrates an example of a transmission timelines 300 that supports discontinuous reception mechanisms for sidelink communications in accordance with aspects of the present disclosure. In some examples, transmission timelines 300 may implement aspects of wireless communication system 100. For example, the transmission timeline 300 may be based on a configuration by a UE 115, and implemented by the UE 115. The transmission timeline 300 may be applicable to implementations or instances when the UE 115 is configured with sidelink communication, such as sidelink communications in V2X and V2V communication systems. In some examples, the transmission timeline 300 may be applicable to implementations or instances when the UE 115 is configured with DRX configuration for sidelink communications, such as sidelink communications in V2X and V2V communication systems.

In the example illustrated in FIG. 3, the transmission timelines 300 may include sidelink communications between a UE 115-a and a UE 115-b, which may be examples of corresponding devices described with reference to FIGS. 1 through 4. The sidelink communications between the UE 115-a and the UE 115-b may be an example of unicast communications including a single sidelink connection for both UEs 115 (e.g., the UE 115-a and the UE 115-b). The UE 115-a or the UE 115-b, or both, may carry sidelink communications (e.g., in an FDD mode) or may be configured to carry sidelink communications (e.g., in a TDD mode). The transmission timelines 300 may include a DTX timeline 305 associated with the UE 115-a. The DTX timeline 305 may include one or more DTX active durations 310 (also referred to as DTX ON durations). The DTX active durations 310 may correspond to time resources (for example, a symbol, a minislot, a slot, a subframe, a frame), as well as frequency resources (for example, subcarriers, carriers). The transmission timelines 300 may include a DTX timeline 315 associated with the UE 115-b. The DTX timeline 315 may include one or more DTX active durations 320, as well as one or more DTX inactive durations 325 (where the UE 115-b is operating in a low power mode). The DTX active durations 320, as well as the DTX inactive durations 325, may correspond to time resources (for example, a symbol, a minislot, a slot, a subframe, a frame), as well as frequency resources (for example, subcarriers, carriers).

The transmission timelines 300 may include a DRX timeline 330 associated with the UE 115-a. The DRX timeline 330 may include one or more DRX active durations 335 (also referred to as DRX ON durations). The DRX active durations 335 may correspond to time resources (for example, a symbol, a minislot, a slot, a subframe, a frame), as well as frequency resources (for example, subcarriers, carriers). The transmission timelines 300 may include a DRX timeline 340 associated with the UE 115-b. The DRX timeline 340 may include one or more DRX active durations 345, as well as one or more DRX inactive durations 350 (where the UE 115-b is operating in a low power mode). The DRX active durations 345, as well as the DRX inactive durations 350, may correspond to time resources (for example, a symbol, a minislot, a slot, a subframe, a frame), as well as frequency resources (for example, subcarriers, carriers).

In some examples, the UE 115-a and the UE 115-b may transmit or receive various communication content (e.g., control information, data) in an asymmetric manner. In other words, traffic associated the UE 115-a and the UE 115-b may be asymmetric in context of the DTX timelines 305, 315 or DRX timelines 330, 340, or both. For example, the UE 115-a may generate and transmit information (e.g., packets) every 320 ms, while the UE 115-b may generate and transmit information (e.g., packets) every 64 ms. In some examples, the UE 115-a or the UE 115-b, or both, may be configured to employ operating modes that reduce power consumption, such as half-duplex communications (e.g., a mode that supports one-way communication via transmission or reception, but not transmission and reception simultaneously). For example, the UE 115-a or the UE 115-b, or both, may be configured (e.g., scheduled) with a time-division duplexing (TDD) configuration. In some examples, the UE 115-a or the UE 115-b, or both, may be configured (e.g., scheduled) with a TDD configuration to manage half-duplex communications between the UE 115-a and the UE 115-b. Sidelink communications between the UE 115-a and the UE 115-b may thus be divided in a time-domain. In other words, at one moment in time either the UE 115-a or the UE 115-b may transmit, or receive, information (e.g., packets) over a connection (e.g., sidelink connection) between the UE 115-a and the UE 115-b.

The UE 115-a or the UE 115-b, or both may determine a DRX configuration associated with the DRX timeline 330, 340 based in part on a DTX configuration. For example, a DTX configuration associated with the UE 115-*a* and for the connection between the UE 115-*a* and the UE 115-*b* may drive a DRX configuration at a peer UE (e.g., the UE 115-*b*). Similarly, a DTX configuration associated with the UE 115-*b* and for the connection between the UE 115-*a* and the UE 115-*b* may drive a DRX configuration at a peer UE (e.g., the UE 115-*a*). By way of example, and as described with reference to FIGS. 2 through 4, the UE 115-*a* and the UE 115-*b* may perform a connection procedure (e.g., an RRC connection setup procedure) to establish or refine a connection (e.g., sidelink connection) between the UE 115-*a* and the UE 115-*b*. During the connection procedure, the UE 115-*a* may provide a DTX configuration that may indicate a DTX pattern (e.g., DTX cycles) of 320 ms. Additionally or alternatively, the DTX configuration may indicate one or more of a DTX timing offset, DTX active durations, or DTX inactive durations, or any combination thereof. Similarly, during the connection procedure, the UE 115-*b* may provide a DTX configuration that may indicate a DTX pattern (e.g., DTX cycles) of 64 ms. Additionally or alternatively, the DTX configuration may indicate one or more of a DTX timing offset, DTX active durations, or DTX inactive durations, or any combination thereof.

Based on the exchange of the DTX configurations, the UE 115-*a* and the UE 115-*b* may negotiate (e.g., determine) the DTX timing offset. In the example of FIG. 3, DRX configuration determination may be based on the DTX configurations of the peer UE (e.g., the UE 115-*a* or the UE 115-*b*). That is, a DRX configuration of the UE 115-*a* may be based on the DTX configuration of the UE 115-*b* (e.g., DRX configuration for the UE 115-*a* is equal to (or corresponds to) DTX configuration of the UE 115-*b*). Similarly, a DRX configuration of the UE 115-*b* may be based on the DTX configuration of the UE 115-*a* (e.g., DRX configuration for the UE 115-*b* is equal to (or corresponds to) DTX configuration of the UE 115-*a*). Therefore, DTX configuration for a connection (e.g., sidelink connection) drive DRX configuration at a peer UE.

Figure 4:
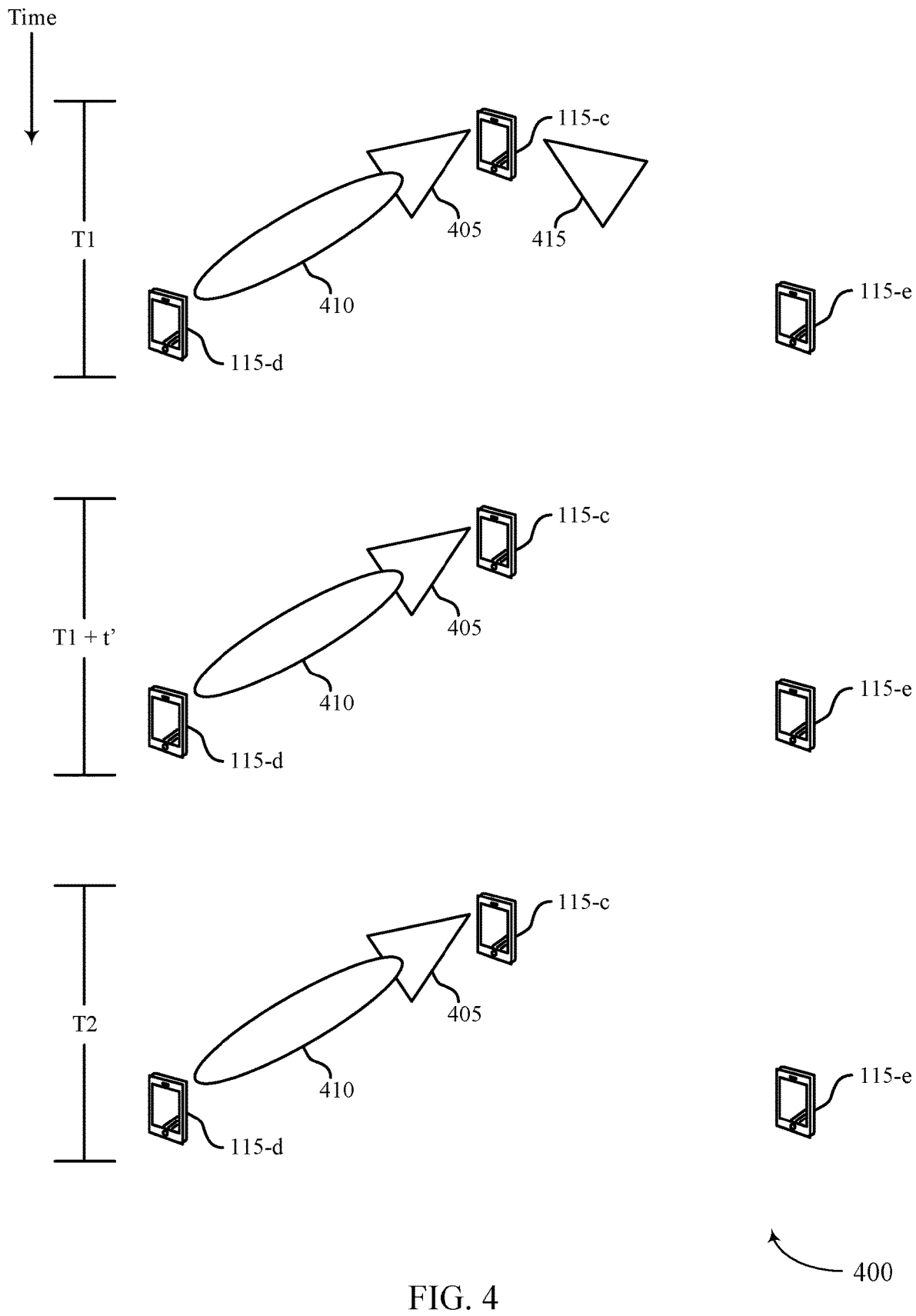
FIG. 4 illustrates an example of a wireless communications system that supports discontinuous reception mechanisms for sidelink communications in accordance with aspects of the present disclosure.

FIG. 4 illustrates an example of a wireless communications system 400 that supports discontinuous reception mechanisms for sidelink communications in accordance with aspects of the present disclosure. In some examples, wireless communications system 400 may implement aspects of wireless communication system 100. For example, the wireless communications system 400 may support multiple radio access technologies including 4G systems such as LTE systems, LTE-A systems, or LTE-A Pro systems, and 5G systems which may be referred to as NR systems. The wireless communications system 400 may also support sidelink communications between multiple UEs 115, such as between a UE 115-*c*, a UE 115-*d*, and a UE 115-*e*, which may be examples of corresponding devices described with reference to FIGS. 1-3. Examples of sidelink communications may include D2D communications, V2X communications systems, V2V communications systems, and the like. The wireless communications system 400 may also support improvements to power consumption and, in some examples, may promote high reliability and low latency sidelink communications, among other benefits.

In the example illustrated in FIG. 4, UE 115-*c* may be a receiver UE while UE 115-*d* and UE 115-*e* may be transmitter UEs. In the illustrated example, UE 115-*c* may be synchronized with UE 115-*d* and UE 115-*e*. In some examples, one or more of UEs 115-*c*, UE 115-*d*, and UE 115-*e* may perform beamformed access over frequency range 2.

Before or during a first time period (e.g., T0 before T1), UE 115-*c* may synchronize with UE 115-*d*. Similarly, before or during first time period, UE 115-*c* may synchronize with UE 115-*e*. Before or during first time period, UE 115-*d* may have DTX-DRX negotiations with UE 115-*c*. Similarly, before or during first time period, UE 115-*d* may have DTX-DRX negotiations with UE 115-*c*. In some examples, the DTX-DRX negotiations may include UE 115-*d* or UE 115-*e*, or both, sending DTX configuration to UE 115-*c*. In some examples, the DTX-DRX negotiations may include UE 115-*c* sending DRX configuration to UE 115-*d* or UE 115-*e*, or both (e.g., broadcast to both UE 115-*d* and UE 115-*e* simultaneously or transmitted to UE 115-*d* and UE 115-*e* via separate transmissions).

In the illustrated example, during a second time period (e.g., T1) UE 115-*d* may complete a data session with UE 115-*c* (e.g., the data session completes during second time period or by the time second time period occurs). As illustrated, UE 115-*c* may detect and receive transmissions from UE 115-*d* via receive beam 405, and may detect and receive transmissions from UE 115-*e* via receive beam 415. As illustrated, UE 115-*d* may transmit data to UE 115-*c* via transmit beam 410. In some examples, UE 115-*e* may transmit data to UE 115-*c* via a transmit beam directed at receive beam 415 (e.g., based on a DTX pattern or configuration of UE 115-*e*).

During a third time period (e.g., T1+t') UE 115-*c* may determine that UE 115-*e* has no more data to transmit to UE 115-*c* (e.g., based on a timeout, etc.). In some examples, UE 115-*c* may stop listening to UE 115-*e* (e.g., deactivate receive beam 415) based on UE 115-*c* determining that UE 115-*e* has no more data to transmit. In some examples, UE 115-*c* may stop listening to UE 115-*e* to save power.

During a fourth time period (e.g., T2) UE 115-*e* may have new data to transmit UE 115-*c* (e.g., a new data session with UE 115-*c*). However, UE 115-*e* may not be configured to communicate the new data to UE 115-*c* using the previous or deprecated DTX pattern because UE 115-*c* deactivated receive beam 415 during the third time period. Even if UE 115-*e* was configured with the DTX pattern between UE 115-*c* and UE 115-*d*, UE 115-*e* may not be capable of transmitting the new data to UE 115-*c* using the DTX pattern between UE 115-*c* and UE 115-*d* because the receive beam 405 that UE 115-*c* listens on may not be pointed towards UE 115-*e*. In some examples, beam discovery may be relatively infrequent. As a result, UE 115-*e* may experience a high latency penalty for the new data. The described techniques may enable UE 115-*e* to indicate the new data session for beamformed access.

In some examples, UE 115-*c* may determine, based at least in part on a received discontinuous transmission configuration, a set of receive beams for discontinuous reception by the UE 115-*c* for a sidelink connection with one or more peers (e.g., UE 115-*d*, UE 115-*e*, etc.). In some examples, UE 115-*c* may transmit, to UE 115-*d* or UE 115-*e*, or both, a DRX configuration 215 that indicates the determined set of receive beams for discontinuous reception for the sidelink connection 205. In some examples, UE 115-*c* may transmit in the DRX configuration an indication of at least one beam of the set of receive beams. In some examples, UE 115-*c* may transmit in the DRX configuration an indication of time resources, or frequency resources, or both, corresponding to one or more receive beams of the set of receive beams. In some examples, UE 115-*c* may transmit, for a set of cycles of the discontinuous reception, the indication of time resources during which UE 115-*c* is to receive using each respective receive beam of the set of receive beams. In some examples, UE 115-*c* may attempt to receive, on the determined set of receive beams over a respective set of occasions during a cycle of the discontinuous reception, a transmission from UE 115-*d* or UE 115-*e*, or both. In some examples, UE 115-*c* may receive, on a receive beam of the set of receive beams, the transmission from UE 115-*d* or UE 115-*e* during one of the set of occasions corresponding to the receive beam.

Figure 5:
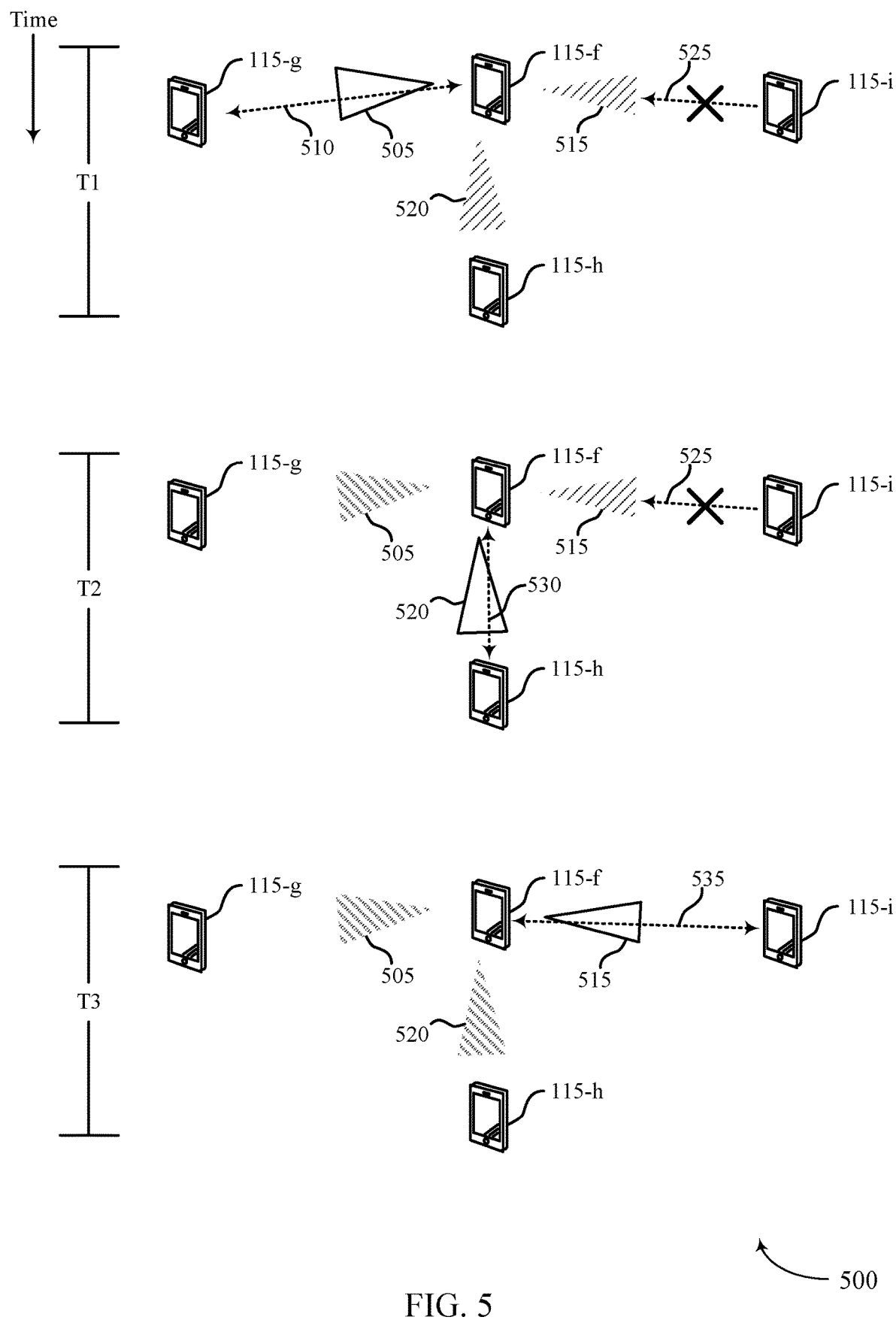
FIG. 5 illustrates an example of a wireless communications system that supports discontinuous reception mechanisms for sidelink communications in accordance with aspects of the present disclosure.

FIG. 5 illustrates an example of a wireless communications system 500 that supports discontinuous reception mechanisms for sidelink communications in accordance with aspects of the present disclosure. In some examples, wireless communications system 500 may implement aspects of wireless communication system 100. For example, the wireless communications system 500 may support multiple radio access technologies including 4G systems such as LTE systems, LTE-A systems, or LTE-A Pro systems, and 5G systems which may be referred to as NR systems. The wireless communications system 500 may also support sidelink communications between multiple UEs 115, such as between a UE 115-*f*, a UE 115-*g*, a UE 115-*h*, and a UE 115-*i*, which may be examples of corresponding devices described with reference to FIGS. 1 through 4. Examples of sidelink communications may include D2D communications, V2X communications systems, V2V communications systems, and the like. The wireless communications system 500 may also support improvements to power consumption and, in some examples, may promote high reliability and low latency sidelink communications, among other benefits.

In the example illustrated in FIG. 5, UE 115-*f* may be a receiver UE while UE 115-*g*, UE 115-*h*, and UE 115-*i* may be transmitter UEs. In the illustrated example, UE 115-*f* may be synchronized with at least one of UE 115-*g*, or UE 115-*h*, or UE 115-*i*, or any combination thereof. In some examples, one or more of UEs 115-*f*, UE 115-*g*, UE 115-*h*, and UE 115-*i* may perform beamformed access over frequency range 2.

In the illustrated example, during a first time period (e.g., T1) UE 115-*f* may determine a DRX configuration update based on DTX information from one or more UE peers (e.g., UE 115-*g*, UE 115-*h*, or UE 115-*i*). As shown, UE 115-*f* may use receive beams 505, 515, and 520, to listen for transmissions from peer UEs. During the first time period, UE 115-*f* may be actively listening for transmission on receive beam 505, while receive beams 515 and 520 are inactive. In some examples, UE 115-*f* may notify the one or more UE peers during a DTX occasion with that peer or during a DRX ON period of that peer. As shown, UE 115-*f* may notify UE 115-*g* of the DRX configuration update during the first time period. In some cases, UE 115-*g* may have communication 510 with UE 115-*f* during the DTX occasion or DRX ON period. In the illustrated example, during the first time period, UE 115-*i* may determine it has new data to transmit to UE 115-*f*. In some examples, UE 115-*i* may be configured with information regarding receive beams 505, 515, and 520. Based on this knowledge, UE 115-*i* may attempt to send a control message or at least a portion of a data message to UE 115-*f* and wait to receive feedback. However, the message from UE 115-*i* may fail to reach UE 115-*f* because, as illustrated, receive beam 515 may be inactive during the first time period.

In the illustrated example, during a second time period (e.g., T2) UE 115-*f* may notify UE 115-*h* of the DRX configuration update. During the second time period, UE 115-*f* may be actively listening for transmission on receive beam 520, while receive beams 505 and 515 are inactive. In some cases, UE 115-*h* may have communication 530 with UE 115-*f* during the DTX occasion or DRX ON period. In the illustrated example, during the second time period, UE 115-*i* may determine it has new data to transmit to UE 115-*f*. Additionally, or alternatively, UE 115-*i* may continue to attempt to indicate the new data to UE 115-*f* during the second time period. In some examples, during the second time period UE 115-*i* may attempt to send or resend a control message or at least a portion of a data message to UE 115-*f* and wait to receive feedback. However, the message(s) from UE 115-*i* may fail to reach UE 115-*f* because, as illustrated, receive beam 515 may be inactive during the second time period.

In the illustrated example, during a third time period (e.g., T3) UE 115-*f* may notify UE 115-*i* of the DRX configuration update. During the third time period, UE 115-*f* may be actively listening for transmission on receive beam 515, while receive beams 505 and 520 are inactive. In some cases, UE 115-*h* may have communication 530 with UE 115-*f* during the DTX occasion or DRX ON period. In some examples, UE 115-*i* may transmit (e.g., communication 530) an indication of the new data. In some examples, UE 115-*i* may transmit an indication of data, an indication of control information, the data itself, or the control information itself to UE 115-*f*. Based on communication 530, UE 115-*f* is informed of the new data from UE 115-*i*.

In some examples, UE 115-*f* may indicate one or more beam directions in the DRX configuration update. In some examples, UE 115-*f* may indicate at least one of time resources, or frequency resources, or a static time period, or any combination thereof. In the third time period the UE 115-*i* is may successfully transmit to UE 115-*f* at least an indication of data, or an indication of control, or the data itself, or the control itself, or any combination thereof.

In some examples, UE 115-*f* may determine a DRX cycle (e.g., during an initial DTX-DRX configuration or update), UE 115-*f* may notify all other peers (e.g., UE 115-*g*, UE 115-*h*, and UE 115-*i*) of the determined DRX cycle (e.g., via a DRX notification or DRX configuration notification message). In some examples, the DRX notification may indicate one or more beam directions over which UE 115-*f* listens over each DRX period.

In some examples, for each DRX cycle UE 115-*f* may indicate specific time (or frequency, or time-frequency) resources over which UE 115-*f* beamforms in some direction. In some examples, the indicated time resources may include static time periods during which UE 115-*f* beamforms in one or more directions (e.g., foregoing data transmission). In some examples, UE 115-*f* may beamform in a dynamic fashion over a set of beams.

In some examples, UE 115-*f* may determine one or more receive beam configurations (e.g., beam set-1, etc.) to communicate on sidelink communications with a peer UE (e.g., UE 115-*g*, UE 115-*h*, and UE 115-*i*). In some examples, UE 115-*f* may assign a receive beam configuration index (RCI) corresponding to the receive beam configuration. In some examples, UE 115-*f* may indicate the RCI to a peer UE (e.g., UE 115-*g*, UE 115-*h*, and UE 115-*i*). In some examples, UE 115-*f* may form receive beams (e.g., b0, b1, b2, b3) and determines that it can receive transmissions from its peer (e.g., UE 115-*g*, UE 115-*h*, or UE 115-*i*) using beams b0 and b1, but not b2 and b3. In some examples, UE 115-*f* may determine that beam b0 is better than b1. In this example, UE 115-*f* may assign RCI-0 corresponding to receive beam b0 and indicate to a peer UE (e.g., UE 115-*g*, UE 115-*h*, or UE 115-*i*) that UE 115-*f* is using RCI-0 for default communication with that peer.

In some examples, UE 115-f may indicate to a peer UE (e.g., UE 115-g, UE 115-h, or UE 115-i) one or multiple DRX configurations. In some examples, each of the multiple DRX configurations may include a receive beam configuration UE 115-f uses to receive during the DRX ON duration. In some examples, each of the multiple DRX configurations may include a DRX period, or a frame offset, or a slot offset, or an ON duration, or the RCI UE 115-f intends to use during the DRX ON duration, or any combination thereof. In some examples, one RCI is indicated for the entire ON duration. In some examples, one or more than RCI is indicated during a subset of time slots within the ON duration time (e.g., b0 during 1100000000, b1 during 0011110000, b2 during 0000001111, etc.)

In some examples, UE 115-f may indicate to a peer UE (e.g., UE 115-g, UE 115-h, or UE 115-i) at least a second receive beam configuration (e.g., a beam set-2 in addition to the beam set-1). In some examples, over the beams in beam set-2, UE 115-f may still receive from the peer UE during the DRX ON duration for the purpose of re-establishing a connection. In some examples, the peer UE (e.g., UE 115-g, UE 115-h, or UE 115-i) may indicate to UE 115-f that it can listen on RCI-1 (e.g., associated with the second receive beam configuration) in addition to RCI-0. In some examples, RCI-1 may be an index that corresponds to a suboptimal receive beam (e.g., a broader beam), but a beam with which UE 115-f is still able to communicate. In some examples, a beam of the second beam configuration may not be a preferred beam for communication with the peer UE, but if the peer UE determines to send data or re-establish a connection during a DRX ON duration, the peer UE may be enabled based on the first receive beam configuration and the second receive beam configuration to send the data whether the receive beam is RCI-0 or RCI-1.

In some examples, UE 115-f may indicate in the DRX configuration a degradation in quality of service expected when using additional beams of the second beam configuration (e.g., beam set-2, RCI-1) compared to preferred beams of the first beam configuration (e.g., beam set-1) used for sidelink communication with the peer. In some examples, the DRX configuration may indicate that the peer UE should expect a signal to noise ratio loss of some level (e.g., x decibels). In some examples, the peer UE may increase a transmission power or downgrade a modulation and coding scheme, or both, when using the second beam configuration to transmit a signal to UE 115-f.

In some examples, UE 115-i may attempt to send a control message or data message, or both, using a beam that is aligned to one of the beams indicated in the DRX configuration from UE 115-f. In some examples, UE 115-i may receive feedback using a beam that is aligned to one of the beams indicated in the DRX configuration from UE 115-f. In some examples, UE 115-i, previously being configured with a receive beam configuration from UE 115-f, may attempt to signal an indication of new data to be transmitted in a resource (e.g., time or frequency resource, or both) indicated in the DRX configuration, whether or not the beam alignment satisfies some beam alignment threshold.

In some examples, UE 115-i may transmit multiple copies of control messages or data message, or both, until UE 115-i determines the transmission is successfully received by UE 115-f (e.g., via feedback from UE 115-f, where feedback might be in the form of HARQ ACK or some RRC response or update message). In some examples, UE 115-i transmitting the multiple copies of control messages or data message, or both, may trigger a DTX-DRX configuration update. In some examples, the update to the DRX of UE 115-f may be transmitted to a peer UE (e.g., UE 115-g, UE 115-h, or UE 115-i) during a DTX occasion with that peer. In some examples, UE 115-f may transmit the DRX configuration during an upcoming DRX ON period with that peer.

In some examples, UE 115-i may send a radio resource control connection reconfiguration message (e.g., send only a radio resource control connection reconfiguration message) to trigger the DTX-DRX configuration update. In some examples, the radio resource control connection reconfiguration message may include a new DTX configuration for a new data session for the data UE 115-i has ready to transmit to UE 115-f. In some examples, UE 115-f, upon receiving the radio resource control connection reconfiguration message from UE 115-i, may send a second radio resource control connection reconfiguration message (e.g., the DRX configuration notification message) to UE 115-i to indicate the new DRX cycle. In some examples, UE 115-f may ask UE 115-i to apply an offset to its new DTX configuration. In some examples, UE 115-f may send UE 115-i an updated DRX configuration using the second radio resource control connection reconfiguration message.

In some examples, UE 115-i may send a data packet (e.g., send only a data packet) to trigger the DTX-DRX configuration update. In some examples, UE 115-f may blind decode this data packet and send a ACK/NACK response to UE 115-i. In some examples, UE 115-i may send both a radio resource control connection reconfiguration message as well as a data packet or at least a portion of a data packet to trigger a DTX-DRX configuration update. When UE 115-i receive no response from UE 115-f, UE 115-i may perform one or more re-transmissions of the data packet or radio resource control connection reconfiguration message, or both.

Figure 6:
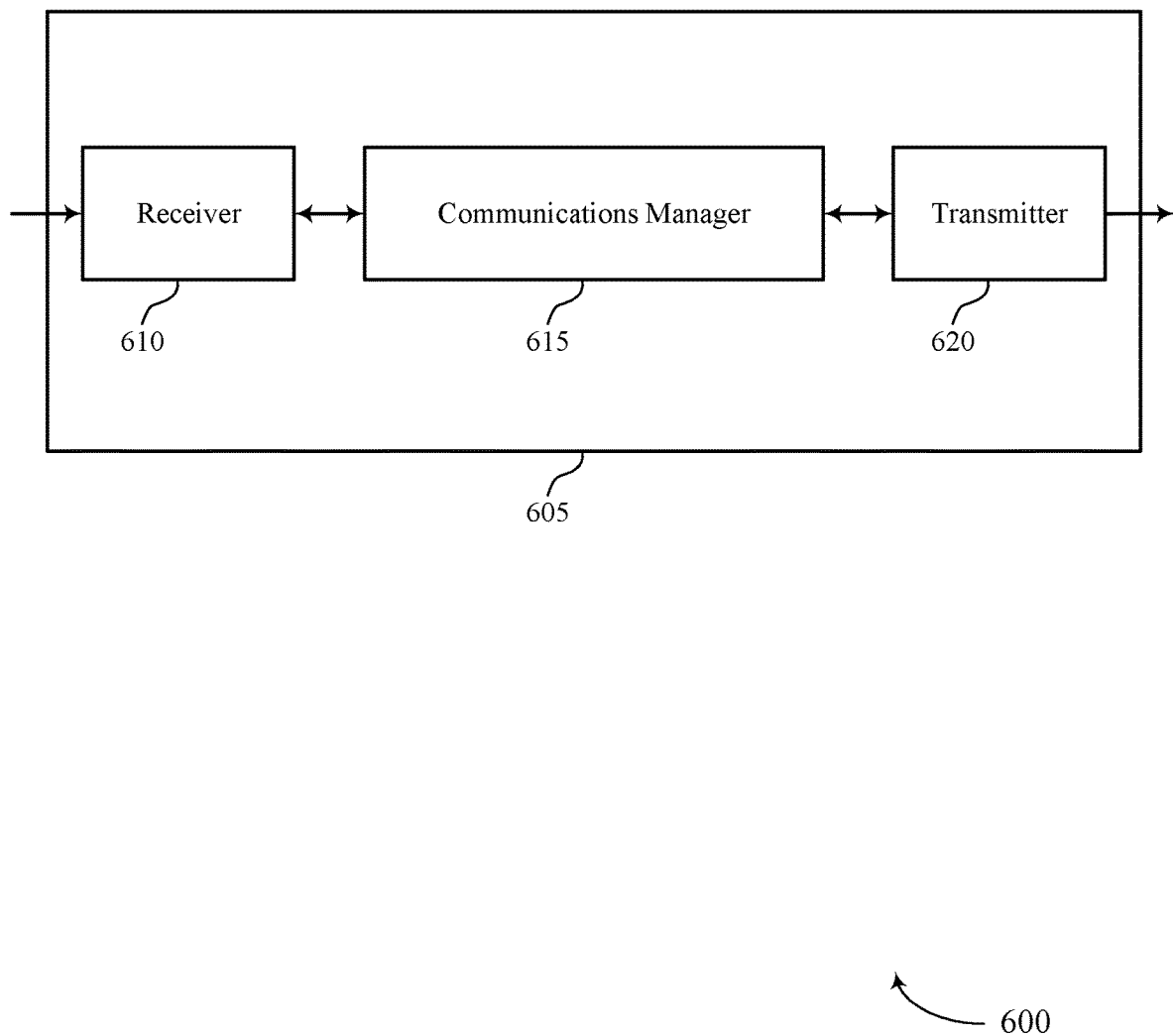
FIGS. 6 and 7 show block diagrams of devices that support discontinuous reception mechanisms for sidelink communications in accordance with aspects of the present disclosure.

FIG. 6 shows a block diagram 600 of a device 605 that supports discontinuous reception mechanisms for sidelink communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to discontinuous reception mechanisms for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a second UE, a discontinuous transmission configuration for a sidelink connection between the first UE and the second UE, determine, based on the received discontinuous transmission configuration, a set of receive beams for discontinuous reception by the first UE for the sidelink connection, and transmit, to the second UE, a discontinuous reception configuration that indicates the determined set of receive beams for discontinuous reception for the sidelink connection. The communications manager 615 may also transmit, to a first UE, a discontinuous transmission configuration for a sidelink connection between the first UE and a second UE, receive, from the first UE, a discontinuous reception configuration for the sidelink connection that indicates a set of receive beams for discontinuous reception by the first UE for the sidelink connection based on the transmitted discontinuous transmission configuration, and transmit, to the first UE using the sidelink connection, signaling according to the transmitted discontinuous transmission configuration and based on the received discontinuous reception configuration. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
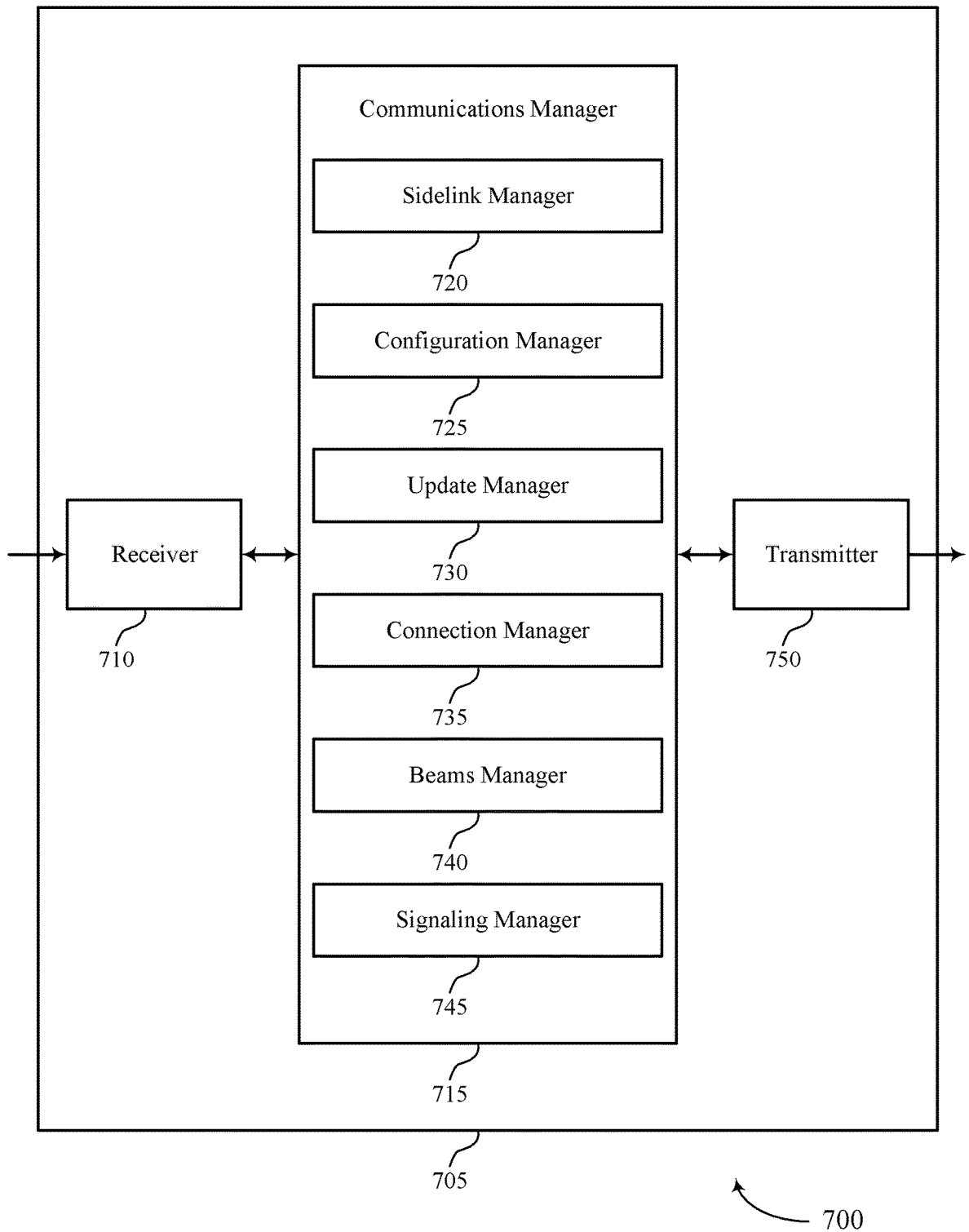

FIG. 7 shows a block diagram 700 of a device 705 that supports discontinuous reception mechanisms for sidelink communications in accordance with aspects of the present disclosure. The device 705 may be an example of aspects of a device 605, or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to discontinuous reception mechanisms for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink manager 720, a configuration manager 725, an update manager 730, a connection manager 735, a beams manager 740, and a signaling manager 745. The communications manager 715 may be an example of aspects of the communications manager 910 described herein.

The sidelink manager 720 may receive, from a second UE, a discontinuous transmission configuration for a sidelink connection between the first UE and the second UE. The configuration manager 725 may determine, based on the received discontinuous transmission configuration, a set of receive beams for discontinuous reception by the first UE for the sidelink connection. The update manager 730 may transmit, to the second UE, a discontinuous reception configuration that indicates the determined set of receive beams for discontinuous reception for the sidelink connection.

The connection manager 735 may transmit, to a first UE, a discontinuous transmission configuration for a sidelink connection between the first UE and a second UE. The beams manager 740 may receive, from the first UE, a discontinuous reception configuration for the sidelink connection that indicates a set of receive beams for discontinuous reception by the first UE for the sidelink connection based on the transmitted discontinuous transmission configuration. The signaling manager 745 may transmit, to the first UE using the sidelink connection, signaling according to the transmitted discontinuous transmission configuration and based on the received discontinuous reception configuration.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
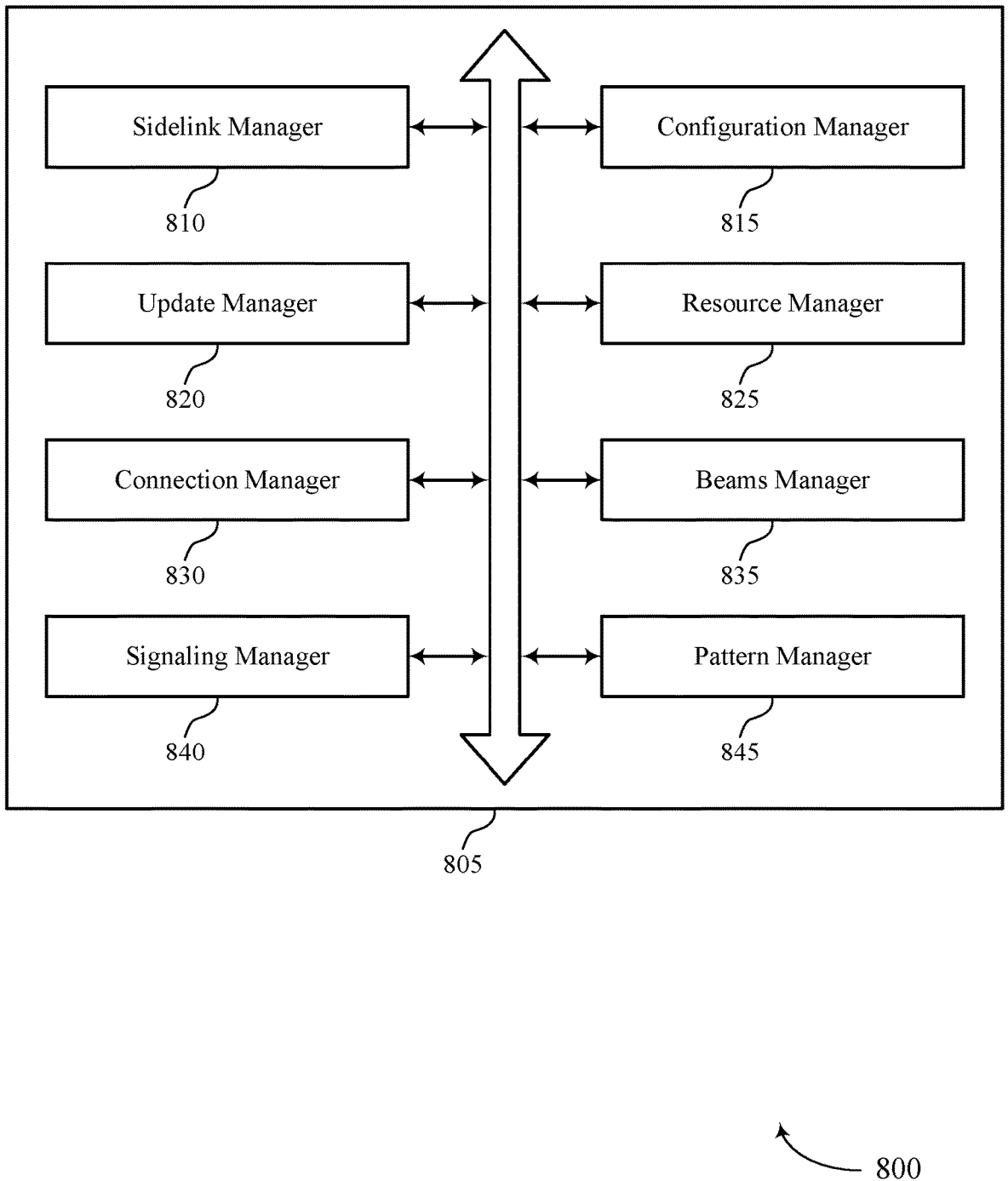
FIG. 8 shows a block diagram of a communications manager that supports discontinuous reception mechanisms for sidelink communications in accordance with aspects of the present disclosure.

FIG. 8 shows a block diagram 800 of a communications manager 805 that supports discontinuous reception mechanisms for sidelink communications in accordance with aspects of the present disclosure. The communications manager 805 may be an example of aspects of a communications manager 615, a communications manager 715, or a communications manager 910 described herein. The communications manager 805 may include a sidelink manager 810, a configuration manager 815, an update manager 820, a resource manager 825, a connection manager 830, a beams manager 835, a signaling manager 840, and a pattern manager 845. Each of these modules may communicate, directly or indirectly, with one another (e.g., via one or more buses).

The sidelink manager 810 may receive, from a second UE, a discontinuous transmission configuration for a sidelink connection between the first UE and the second UE. In some examples, the sidelink manager 810 may attempt to receive, on the determined set of receive beams over a respective set of occasions during a cycle of the discontinuous reception, a transmission from the second UE. In some examples, the sidelink manager 810 may receive, on a receive beam of the set of receive beams, the transmission from the second UE during one of the set of occasions corresponding to the receive beam.

In some examples, receiving, from the second UE over the sidelink connection, a first radio resource control connection reconfiguration message, where the first radio resource control connection reconfiguration message includes the discontinuous transmission configuration. In some examples, the sidelink manager 810 may transmit, to the second UE, a second radio resource control connection reconfiguration message based on the first radio resource control connection reconfiguration message from the second UE. In some examples, the sidelink manager 810 may transmit, to the second UE, a request to apply an offset to the discontinuous transmission configuration based on the first radio resource control connection reconfiguration message from the second UE.

The configuration manager 815 may determine, based on the received discontinuous transmission configuration, a set of receive beams for discontinuous reception by the first UE for the sidelink connection. In some examples, assigning, to the second UE, a first index that corresponds to a receive beam configuration of the discontinuous reception configuration, where the discontinuous reception configuration includes the receive beam configuration and the first assigned index.

In some examples, the configuration manager 815 may identify a set of receive beams the first UE is configured to form. In some examples, the configuration manager 815 may determine to receive transmissions from the second UE using a first receive beam and a second receive beam of the set of receive beams, where the receive beam configuration indicates the first receive beam and the second receive beam.

In some examples, the configuration manager 815 may identify that the first receive beam is preferred over the second receive beam, where the first assigned index corresponds to the first receive beam based on the first receive beam being preferred over the second receive beam. In some examples, the configuration manager 815 may assign, to the second UE, a second index that corresponds to a second receive beam configuration of the discontinuous reception configuration, where the discontinuous reception configuration includes the receive beam configuration, the first assigned index, and the second assigned index, and where the second UE may reestablish a connection with the first UE using the first assigned index or the second assigned index.

In some examples, the configuration manager 815 may indicate to the second UE that the second assigned index includes a degradation in quality of service in relation to the first assigned index. In some cases, the first assigned index is indicated for an entire discontinuous reception ON duration. In some cases, the first assigned index is indicated for a first duration of the discontinuous reception ON duration and a second index is indicated for a second duration of the discontinuous reception ON duration, the second index to a second receive beam configuration of the discontinuous reception configuration.

In some cases, the discontinuous reception configuration includes an indication of a discontinuous reception period, or a frame offset, or a slot offset, or a discontinuous reception ON duration, or an index to a receive beam configuration of the discontinuous reception configuration that the first UE selects to use during the discontinuous reception ON duration, or a combination thereof.

The update manager 820 may transmit, to the second UE, a discontinuous reception configuration that indicates the determined set of receive beams for discontinuous reception for the sidelink connection. In some examples, the update manager 820 may transmit an indication of at least one beam of the set of receive beams. In some examples, the update manager 820 may transmit, to the second UE, a set of discontinuous reception configurations, including the discontinuous reception configuration, where each of the set of discontinuous reception configurations includes a receive beam configuration that the first UE is to use during a single discontinuous reception on duration of the second UE.

In some cases, the discontinuous reception configuration is transmitted to the second UE during a discontinuous transmission occasion indicated in the received discontinuous transmission configuration. In some cases, the discontinuous reception configuration is transmitted to the second UE during a discontinuous reception on duration of the second UE.

The connection manager 830 may transmit, to a first UE, a discontinuous transmission configuration for a sidelink connection between the first UE and a second UE. In some examples, the connection manager 830 may reestablish a connection with the first UE using the first received index or the second received index. In some examples, the connection manager 830 may transmit a first instance of a message in a first beam direction indicated in the discontinuous reception configuration. In some examples, the connection manager 830 may transmit a second instance of the message in a second beam direction indicated in the discontinuous reception configuration based on receiving negative feedback or not receiving feedback for the first instance.

In some examples, the connection manager 830 may receive positive feedback for the message. In some examples, the connection manager 830 may bypass transmitting a third instance of the message in a third beam direction based on receiving the positive feedback.

In some examples, the connection manager 830 may transmit, to the first UE using the sidelink connection, a first radio resource control connection reconfiguration message, where the first radio resource control connection reconfiguration message includes the discontinuous transmission configuration. In some examples, the connection manager 830 may receive, from the first UE, a second radio resource control connection reconfiguration message based on the transmitting of the first radio resource control connection reconfiguration message to the first UE.

In some examples, the connection manager 830 may receive, from the first UE, a request to apply an offset to the discontinuous transmission configuration based on the transmitting of the first radio resource control connection reconfiguration message to the first UE.

In some examples, the connection manager 830 may transmit a data packet to the first UE using the sidelink connection. In some examples, the connection manager 830 may receive, from the first UE, acknowledgment feedback indicating a negative acknowledgement or no acknowledgement. In some examples, the connection manager 830 may retransmit, based on the received acknowledgement feedback, the data packet to the first UE using the sidelink connection.

In some examples, the connection manager 830 may receive a radio resource control connection reconfiguration message from the first UE at least in part in response to the retransmission of the data packet. In some examples, the connection manager 830 may transmit, to the first UE using the sidelink connection, a first radio resource control connection reconfiguration message and at least a portion of a data packet. In some examples, the connection manager 830 may receive a second radio resource control connection reconfiguration message from the first UE based on the first radio resource control connection reconfiguration message or the at least a portion of the data packet.

The beams manager 835 may receive, from the first UE, a discontinuous reception configuration for the sidelink connection that indicates a set of receive beams for discontinuous reception by the first UE for the sidelink connection based on the transmitted discontinuous transmission configuration. In some examples, the beams manager 835 may identify a transmission beam of the second UE corresponding to a receive beam of the first UE that is indicated in the discontinuous reception configuration, the signaling transmitted on the identified transmission beam.

The signaling manager 840 may transmit, to the first UE using the sidelink connection, signaling according to the transmitted discontinuous transmission configuration and based on the received discontinuous reception configuration.

The resource manager 825 may transmit an indication of time resources, or frequency resources, or both, corresponding to one or more receive beams of the set of receive beams. In some examples, the resource manager 825 may transmit, for a set of cycles of the discontinuous reception, the indication of time resources during which the first UE is to receive using each respective receive beam of the set of receive beams.

The pattern manager 845 may determine, from the discontinuous reception configuration, time resources, or frequency resources, or both, corresponding to one or more receive beams of the set of receive beams. In some examples, the pattern manager 845 may receive, from the first UE, a set of discontinuous reception configurations, including the discontinuous reception configuration, where each of the set of discontinuous reception configurations includes a receive beam configuration that the first UE is to use during a single discontinuous reception on duration of the second UE.

In some examples, the pattern manager 845 may receive, from the first UE, a first index that corresponds to the receive beam configuration of the discontinuous reception configuration, where the discontinuous reception configuration includes the receive beam configuration and the first assigned index. In some examples, the pattern manager 845 may receive, from the first UE, a second index that corresponds to a second receive beam configuration of the discontinuous reception configuration.

In some examples, the pattern manager 845 may determine the second received index includes a degradation in quality of service in relation to the first received index. In some examples, the pattern manager 845 may increase a transmission power or downgrading a modulation and coding scheme, or both, when using the second received index to transmit a signal to the first UE. In some cases, the discontinuous reception configuration is received during a discontinuous transmission occasion indicated in the transmitted discontinuous transmission configuration. In some cases, the discontinuous reception configuration is received during a discontinuous reception on duration of the second UE.

Figure 9:
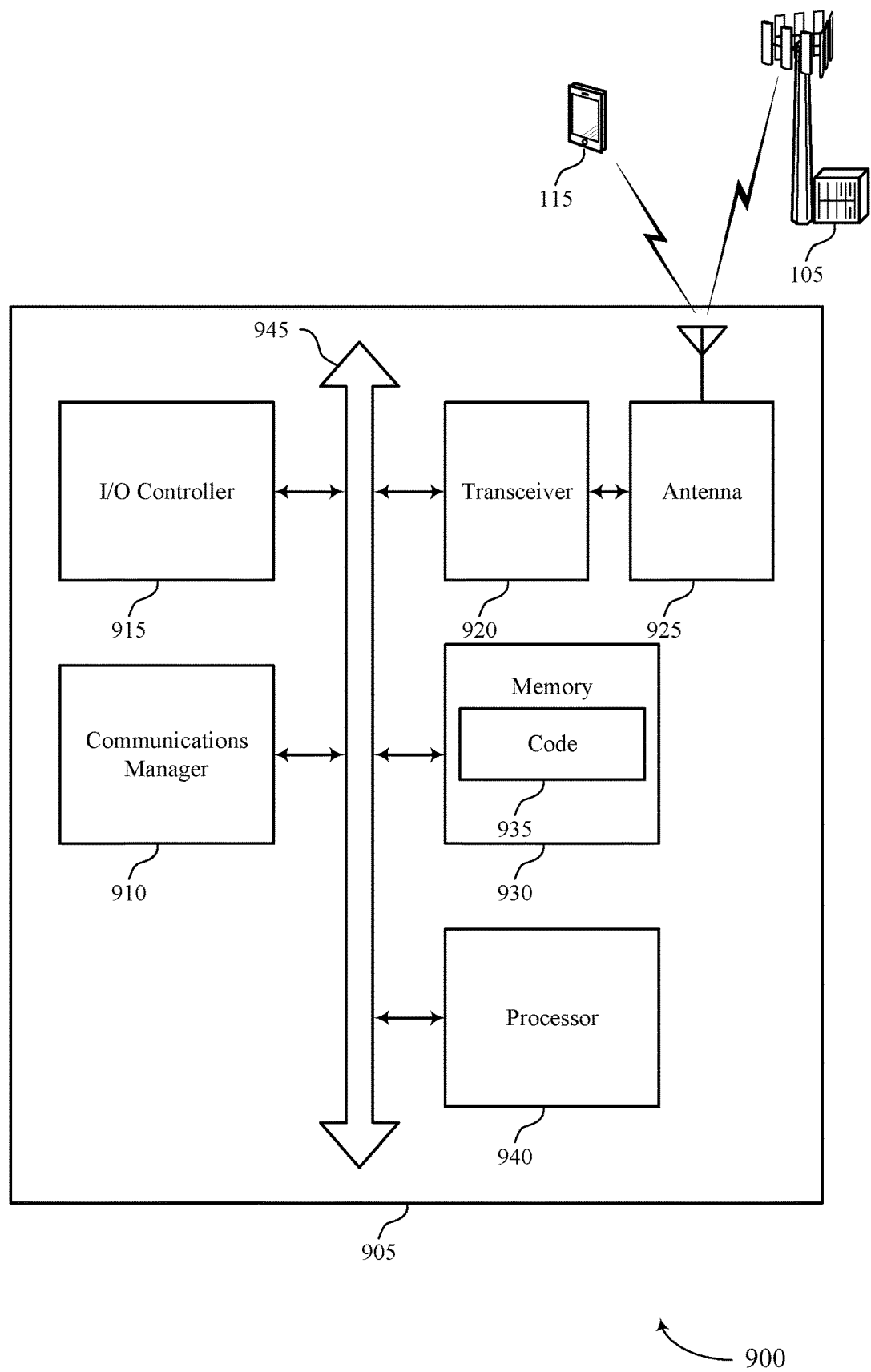
FIG. 9 shows a diagram of a system including a device that supports discontinuous reception mechanisms for sidelink communications in accordance with aspects of the present disclosure.

FIG. 9 shows a diagram of a system 900 including a device 905 that supports discontinuous reception mechanisms for sidelink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a second UE, a discontinuous transmission configuration for a sidelink connection between the first UE and the second UE, determine, based on the received discontinuous transmission configuration, a set of receive beams for discontinuous reception by the first UE for the sidelink connection, and transmit, to the second UE, a discontinuous reception configuration that indicates the determined set of receive beams for discontinuous reception for the sidelink connection. The communications manager 910 may also transmit, to a first UE, a discontinuous transmission configuration for a sidelink connection between the first UE and a second UE, receive, from the first UE, a discontinuous reception configuration for the sidelink connection that indicates a set of receive beams for discontinuous reception by the first UE for the sidelink connection based on the transmitted discontinuous transmission configuration, and transmit, to the first UE using the sidelink connection, signaling according to the transmitted discontinuous transmission configuration and based on the received discontinuous reception configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting discontinuous reception mechanisms for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
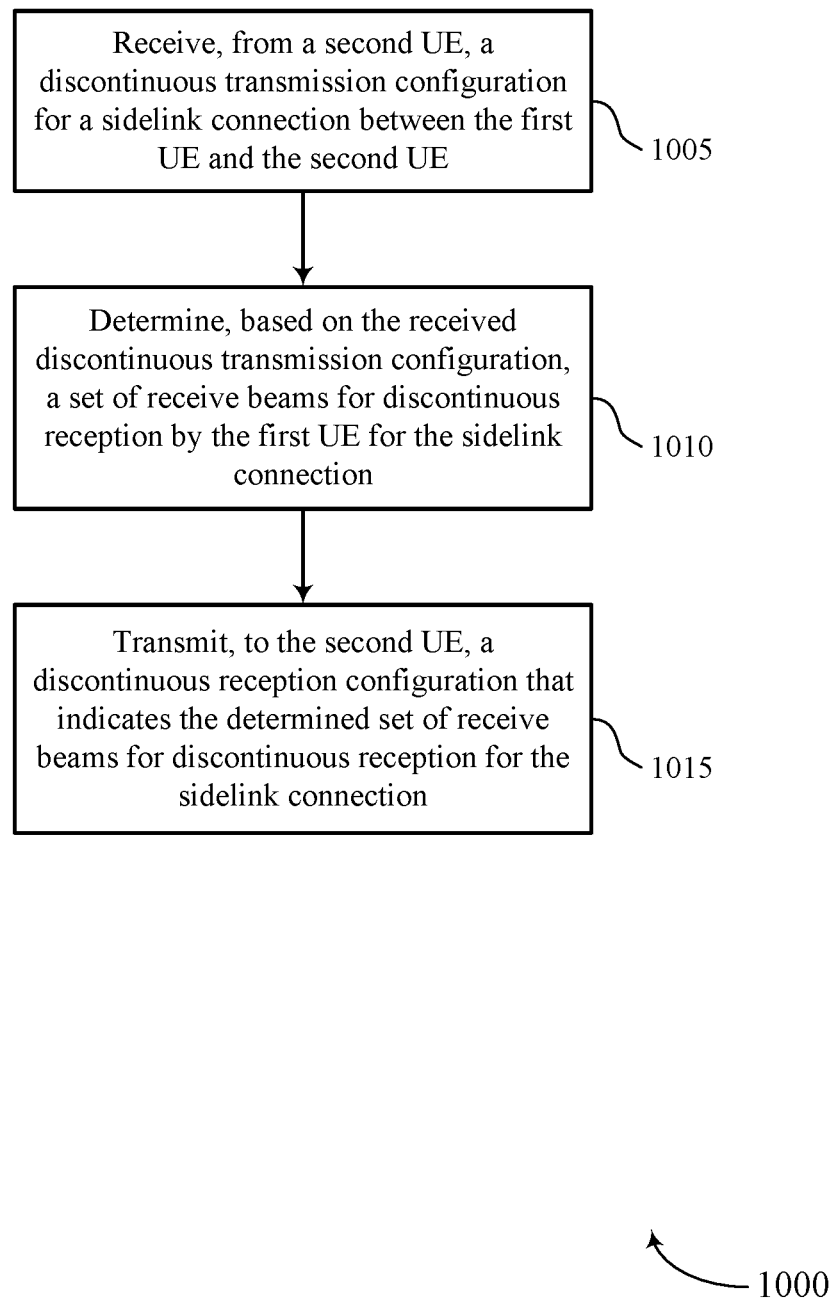
FIGS. 10 through 13 show flowcharts illustrating methods that support discontinuous reception mechanisms for sidelink communications in accordance with aspects of the present disclosure.

FIG. 10 shows a flowchart illustrating a method 1000 that supports discontinuous reception mechanisms for sidelink communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may receive, from a second UE, a discontinuous transmission configuration for a sidelink connection between the first UE and the second UE. The operations of 1005 may be performed according to the methods described herein. In some examples, aspects of the operations of 1005 may be performed by a sidelink manager as described with reference to FIGS. 6 through 9.

At 1010, the UE may determine, based on the received discontinuous transmission configuration, a set of receive beams for discontinuous reception by the first UE for the sidelink connection. The operations of 1010 may be performed according to the methods described herein. In some examples, aspects of the operations of 1010 may be performed by a configuration manager as described with reference to FIGS. 6 through 9.

At 1015, the UE may transmit, to the second UE, a discontinuous reception configuration that indicates the determined set of receive beams for discontinuous reception for the sidelink connection. The operations of 1015 may be performed according to the methods described herein. In some examples, aspects of the operations of 1015 may be performed by an update manager as described with reference to FIGS. 6 through 9.

Figure 11:
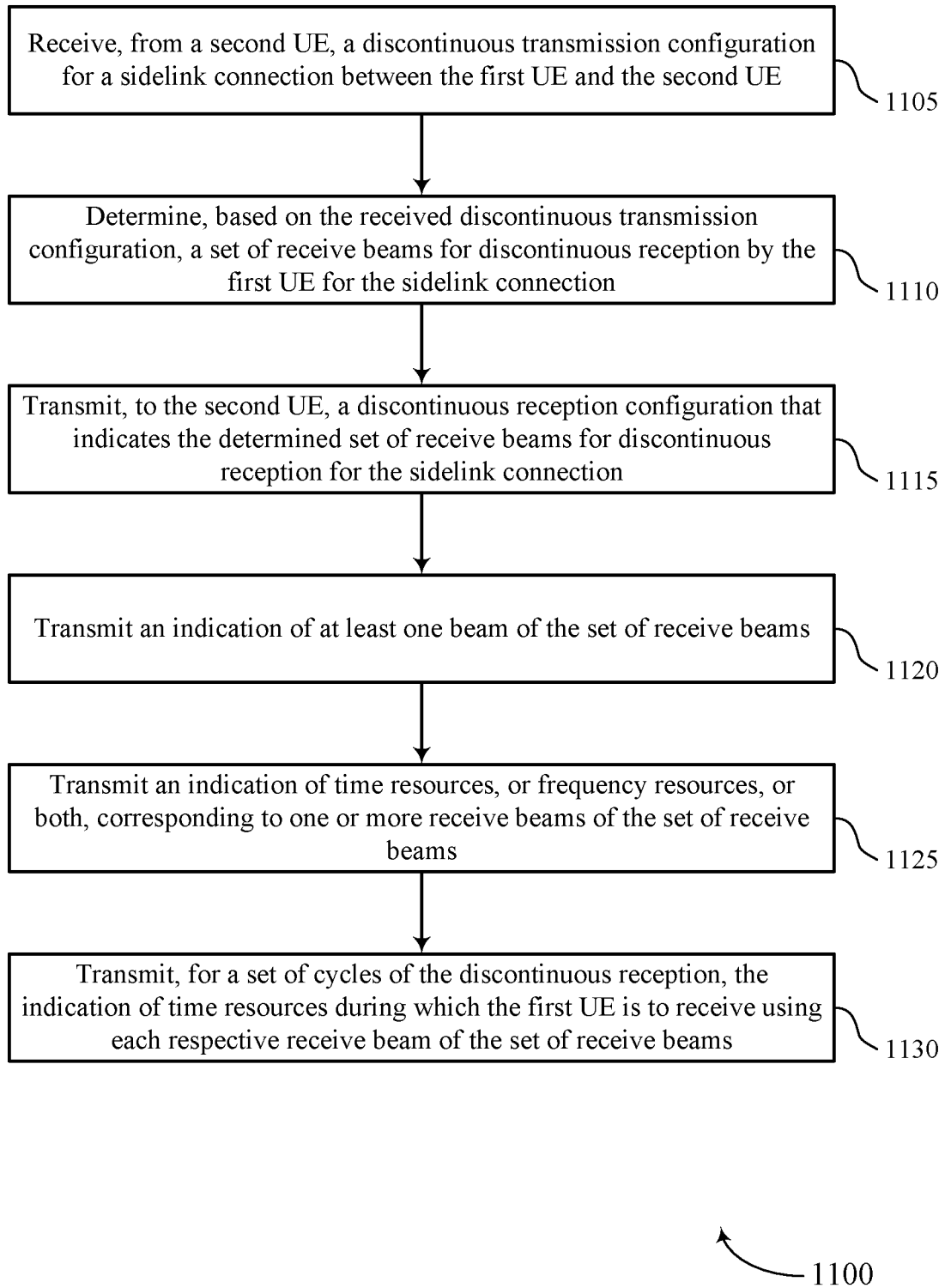

FIG. 11 shows a flowchart illustrating a method 1100 that supports discontinuous reception mechanisms for sidelink communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may receive, from a second UE, a discontinuous transmission configuration for a sidelink connection between the first UE and the second UE. The operations of 1105 may be performed according to the methods described herein. In some examples, aspects of the operations of 1105 may be performed by a sidelink manager as described with reference to FIGS. 6 through 9.

At 1110, the UE may determine, based on the received discontinuous transmission configuration, a set of receive beams for discontinuous reception by the first UE for the sidelink connection. The operations of 1110 may be performed according to the methods described herein. In some examples, aspects of the operations of 1110 may be performed by a configuration manager as described with reference to FIGS. 6 through 9.

At 1115, the UE may transmit, to the second UE, a discontinuous reception configuration that indicates the determined set of receive beams for discontinuous reception for the sidelink connection. The operations of 1115 may be performed according to the methods described herein. In some examples, aspects of the operations of 1115 may be performed by an update manager as described with reference to FIGS. 6 through 9.

At 1120, the UE may transmit an indication of at least one beam of the set of receive beams. The operations of 1120 may be performed according to the methods described herein. In some examples, aspects of the operations of 1120 may be performed by an update manager as described with reference to FIGS. 6 through 9.

At 1125, the UE may transmit an indication of time resources, or frequency resources, or both, corresponding to one or more receive beams of the set of receive beams. The operations of 1125 may be performed according to the methods described herein. In some examples, aspects of the operations of 1125 may be performed by a resource manager as described with reference to FIGS. 6 through 9.

At 1130, the UE may transmit, for a set of cycles of the discontinuous reception, the indication of time resources during which the first UE is to receive using each respective receive beam of the set of receive beams. The operations of 1130 may be performed according to the methods described herein. In some examples, aspects of the operations of 1130 may be performed by a resource manager as described with reference to FIGS. 6 through 9.

Figure 12:
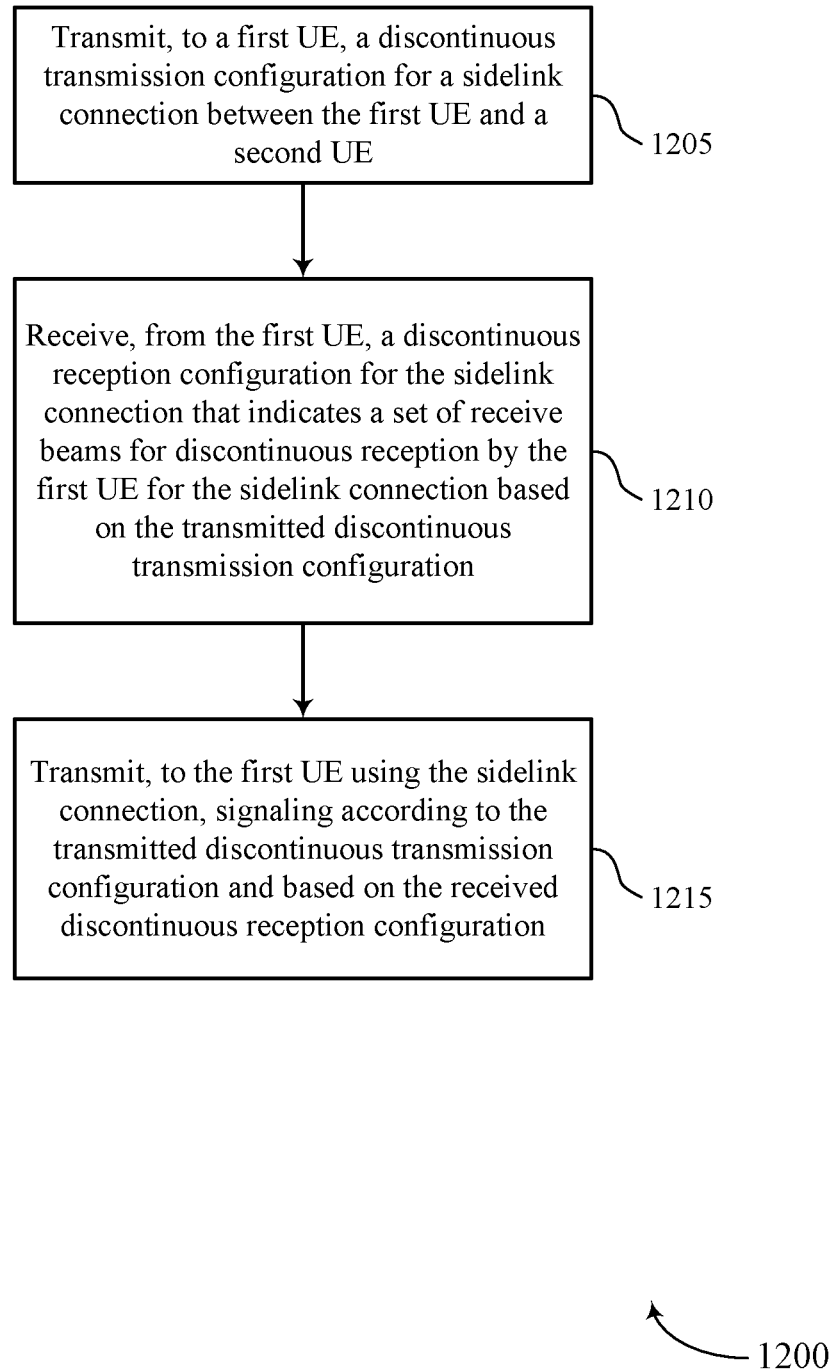

FIG. 12 shows a flowchart illustrating a method 1200 that supports discontinuous reception mechanisms for sidelink communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may transmit, to a first UE, a discontinuous transmission configuration for a sidelink connection between the first UE and a second UE. The operations of 1205 may be performed according to the methods described herein. In some examples, aspects of the operations of 1205 may be performed by a connection manager as described with reference to FIGS. 6 through 9.

At 1210, the UE may receive, from the first UE, a discontinuous reception configuration for the sidelink connection that indicates a set of receive beams for discontinuous reception by the first UE for the sidelink connection based on the transmitted discontinuous transmission configuration. The operations of 1210 may be performed according to the methods described herein. In some examples, aspects of the operations of 1210 may be performed by a beams manager as described with reference to FIGS. 6 through 9.

At 1215, the UE may transmit, to the first UE using the sidelink connection, signaling according to the transmitted discontinuous transmission configuration and based on the received discontinuous reception configuration. The operations of 1215 may be performed according to the methods described herein. In some examples, aspects of the operations of 1215 may be performed by a signaling manager as described with reference to FIGS. 6 through 9.

Figure 13:
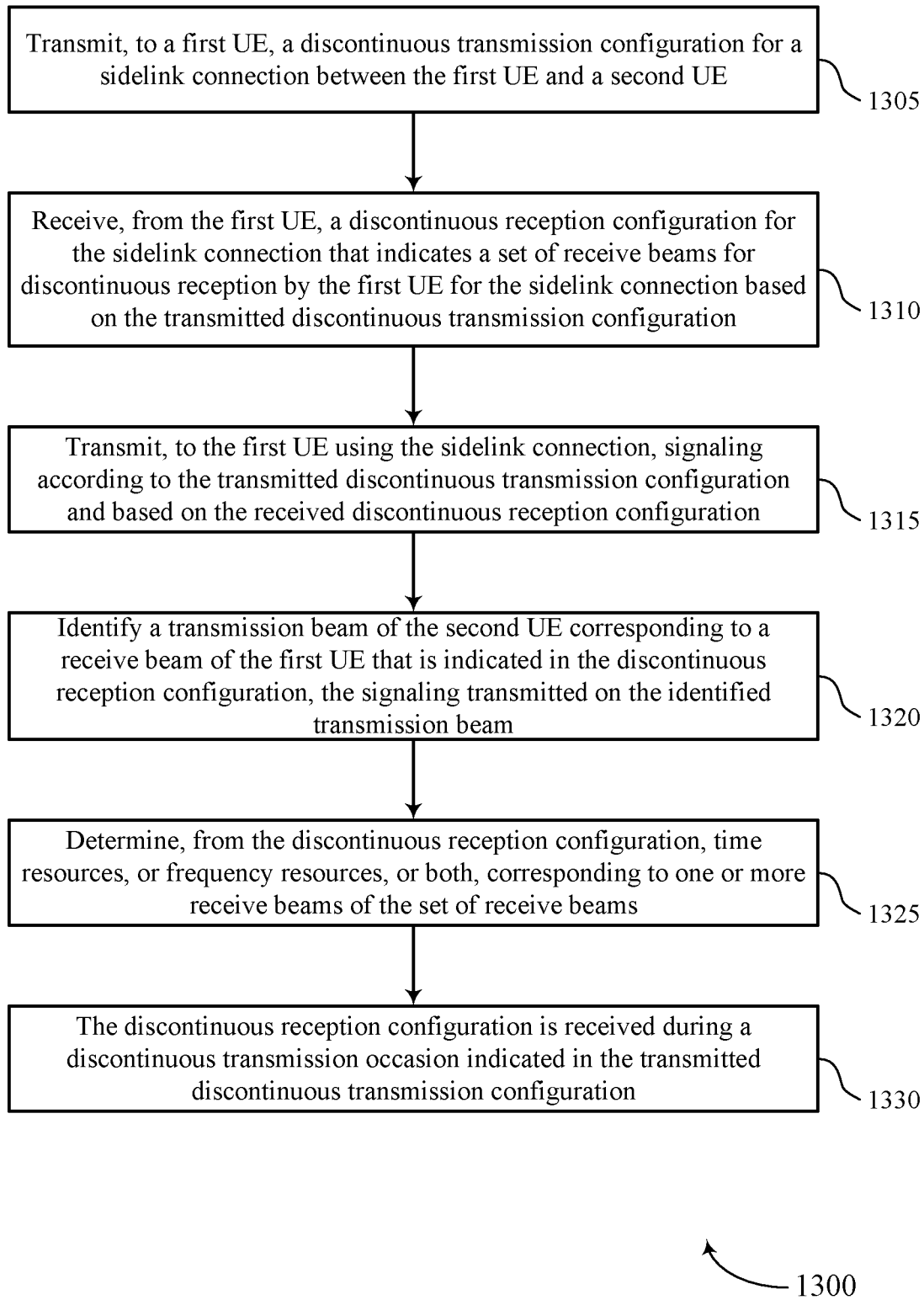

FIG. 13 shows a flowchart illustrating a method 1300 that supports discontinuous reception mechanisms for sidelink communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may transmit, to a first UE, a discontinuous transmission configuration for a sidelink connection between the first UE and a second UE. The operations of 1305 may be performed according to the methods described herein. In some examples, aspects of the operations of 1305 may be performed by a connection manager as described with reference to FIGS. 6 through 9.

At 1310, the UE may receive, from the first UE, a discontinuous reception configuration for the sidelink connection that indicates a set of receive beams for discontinuous reception by the first UE for the sidelink connection based on the transmitted discontinuous transmission configuration. The operations of 1310 may be performed according to the methods described herein. In some examples, aspects of the operations of 1310 may be performed by a beams manager as described with reference to FIGS. 6 through 9.

At 1315, the UE may transmit, to the first UE using the sidelink connection, signaling according to the transmitted discontinuous transmission configuration and based on the received discontinuous reception configuration. The operations of 1315 may be performed according to the methods described herein. In some examples, aspects of the operations of 1315 may be performed by a signaling manager as described with reference to FIGS. 6 through 9.

At 1320, the UE may identify a transmission beam of the second UE corresponding to a receive beam of the first UE that is indicated in the discontinuous reception configuration, the signaling transmitted on the identified transmission beam. The operations of 1320 may be performed according to the methods described herein. In some examples, aspects of the operations of 1320 may be performed by a beams manager as described with reference to FIGS. 6 through 9.

At 1325, the UE may determine, from the discontinuous reception configuration, time resources, or frequency resources, or both, corresponding to one or more receive beams of the set of receive beams. The operations of 1325 may be performed according to the methods described herein. In some examples, aspects of the operations of 1325 may be performed by a pattern manager as described with reference to FIGS. 6 through 9.

At 1330, the UE may the discontinuous reception configuration is received during a discontinuous transmission occasion indicated in the transmitted discontinuous transmission configuration. The operations of 1330 may be performed according to the methods described herein. In some examples, aspects of the operations of 1330 may be performed by a pattern manager as described with reference to FIGS. 6 through 9.

The following provides an overview of aspects of the present disclosure:

Aspect 1: A method for wireless communications at a first UE, comprising: receiving, from a second UE, a discontinuous transmission configuration for a sidelink connection between the first UE and the second UE; determining, based at least in part on the received discontinuous transmission configuration, a set of receive beams for discontinuous reception by the first UE for the sidelink connection; and transmitting, to the second UE, a discontinuous reception configuration that indicates the determined set of receive beams for discontinuous reception for the sidelink connection.

Aspect 2: The method of aspect 1, wherein transmitting the discontinuous reception configuration further comprises: transmitting an indication of at least one beam of the set of receive beams.

Aspect 3: The method of any of aspects 1 through 2, wherein transmitting the discontinuous reception configuration further comprises: transmitting an indication of time resources, or frequency resources, or both, corresponding to one or more receive beams of the set of receive beams.

Aspect 4: The method of aspect 3, wherein transmitting the indication of the time resources, or the frequency resources, or both comprises: transmitting, for a set of cycles of the discontinuous reception, the indication of time resources during which the first UE is to receive using each respective receive beam of the set of receive beams.

Aspect 5: The method of any of aspects 1 through 4, further comprising: attempting to receive, on the determined set of receive beams over a respective set of occasions during a cycle of the discontinuous reception, a transmission from the second UE; and receiving, on a receive beam of the set of receive beams, the transmission from the second UE during one of the set of occasions corresponding to the receive beam.

Aspect 6: The method of any of aspects 1 through 5, wherein the discontinuous reception configuration is transmitted to the second UE during a discontinuous transmission occasion indicated in the received discontinuous transmission configuration.

Aspect 7: The method of any of aspects 1 through 6, wherein the discontinuous reception configuration is transmitted to the second UE during a discontinuous reception on duration of the second UE.

Aspect 8: The method of any of aspects 1 through 7, further comprising: transmitting, to the second UE, a plurality of discontinuous reception configurations, including the discontinuous reception configuration, wherein each of the plurality of discontinuous reception configurations includes a receive beam configuration that the first UE is to use during a single discontinuous reception on duration of the second UE.

Aspect 9: The method of any of aspects 1 through 8, further comprising: assigning, to the second UE, a first index that corresponds to a receive beam configuration of the discontinuous reception configuration, wherein the discontinuous reception configuration comprises the receive beam configuration and the first assigned index.

Aspect 10: The method of aspect 9, further comprising: identifying a plurality of receive beams the first UE is configured to form; and determining to receive transmissions from the second UE using a first receive beam and a second receive beam of the plurality of receive beams, wherein the receive beam configuration indicates the first receive beam and the second receive beam.

Aspect 11: The method of aspect 10, further comprising: identifying that the first receive beam is preferred over the second receive beam, wherein the first assigned index corresponds to the first receive beam based at least in part on the first receive beam being preferred over the second receive beam.

Aspect 12: The method of any of aspects 9 through 11, wherein the first assigned index is indicated for an entire discontinuous reception ON duration.

Aspect 13: The method of any of aspects 9 through 12, wherein the first assigned index is indicated for a first duration of the discontinuous reception ON duration and a second index is indicated for a second duration of the discontinuous reception ON duration, the second index to a second receive beam configuration of the discontinuous reception configuration.

Aspect 14: The method of any of aspects 9 through 13, further comprising: assigning, to the second UE, a second index that corresponds to a second receive beam configuration of the discontinuous reception configuration, wherein the discontinuous reception configuration comprises the receive beam configuration, the first assigned index, and the second assigned index, and wherein the second UE may reestablish a connection with the first UE using the first assigned index or the second assigned index.

Aspect 15: The method of aspect 14, further comprising: indicating to the second UE that the second assigned index comprises a degradation in quality of service in relation to the first assigned index.

Aspect 16: The method of any of aspects 1 through 15, wherein the discontinuous reception configuration comprises an indication of a discontinuous reception period, or a frame offset, or a slot offset, or a discontinuous reception ON duration, or an index to a receive beam configuration of the discontinuous reception configuration that the first UE selects to use during the discontinuous reception ON duration, or a combination thereof.

Aspect 17: The method of any of aspects 1 through 16, further comprising: receiving, from the second UE over the sidelink connection, a first radio resource control connection reconfiguration message, wherein the first radio resource control connection reconfiguration message comprises the discontinuous transmission configuration.

Aspect 18: The method of aspect 17, further comprising: transmitting, to the second UE, a second radio resource control connection reconfiguration message based at least in part on the first radio resource control connection reconfiguration message from the second UE.

Aspect 19: The method of any of aspects 17 through 18, further comprising: transmitting, to the second UE, a request to apply an offset to the discontinuous transmission configuration based at least in part on the first radio resource control connection reconfiguration message from the second UE.

Aspect 20: A method for wireless communications at a second UE, comprising: transmitting, to a first UE, a discontinuous transmission configuration for a sidelink connection between the first UE and a second UE; receiving, from the first UE, a discontinuous reception configuration for the sidelink connection that indicates a set of receive beams for discontinuous reception by the first UE for the sidelink connection based at least in part on the transmitted discontinuous transmission configuration; and transmitting, to the first UE using the sidelink connection, signaling according to the transmitted discontinuous transmission configuration and based at least in part on the received discontinuous reception configuration.

Aspect 21: The method of aspect 20, further comprising: identifying a transmission beam of the second UE corresponding to a receive beam of the first UE that is indicated in the discontinuous reception configuration, the signaling transmitted on the identified transmission beam.

Aspect 22: The method of any of aspects 20 through 21, further comprising: determining, from the discontinuous reception configuration, time resources, or frequency resources, or both, corresponding to one or more receive beams of the set of receive beams.

Aspect 23: The method of any of aspects 20 through 22, wherein the discontinuous reception configuration is received during a discontinuous transmission occasion indicated in the transmitted discontinuous transmission configuration.

Aspect 24: The method of any of aspects 20 through 23, wherein the discontinuous reception configuration is received during a discontinuous reception on duration of the second UE.

Aspect 25: The method of any of aspects 20 through 24, further comprising: receiving, from the first UE, a plurality of discontinuous reception configurations, including the discontinuous reception configuration, wherein each of the plurality of discontinuous reception configurations includes a receive beam configuration that the first UE is to use during a single discontinuous reception on duration of the second UE.

Aspect 26: The method of aspect 25, further comprising: receiving, from the first UE, a first index that corresponds to the receive beam configuration of the discontinuous reception configuration, wherein the discontinuous reception configuration comprises the receive beam configuration and the first assigned index.

Aspect 27: The method of aspect 26, further comprising: receiving, from the first UE, a second index that corresponds to a second receive beam configuration of the discontinuous reception configuration.

Aspect 28: The method of aspect 27, further comprising: reestablishing a connection with the first UE using the first received index or the second received index.

Aspect 29: The method of any of aspects 27 through 28, further comprising: determining the second received index comprises a degradation in quality of service in relation to the first received index; and increasing a transmission power or downgrading a modulation and coding scheme, or both, when using the second received index to transmit a signal to the first UE.

Aspect 30: The method of any of aspects 20 through 29, further comprising: transmitting a first instance of a message in a first beam direction indicated in the discontinuous reception configuration; transmitting a second instance of the message in a second beam direction indicated in the discontinuous reception configuration based at least in part on receiving negative feedback or not receiving feedback for the first instance; receiving positive feedback for the message; and bypassing transmitting a third instance of the message in a third beam direction based at least in part on receiving the positive feedback.

Aspect 31: The method of any of aspects 20 through 30, further comprising: transmitting, to the first UE using the sidelink connection, a first radio resource control connection reconfiguration message, wherein the first radio resource control connection reconfiguration message comprises the discontinuous transmission configuration.

Aspect 32: The method of aspect 31, further comprising: receiving, from the first UE, a second radio resource control connection reconfiguration message based at least in part on the transmitting of the first radio resource control connection reconfiguration message to the first UE.

Aspect 33: The method of any of aspects 31 through 32, further comprising: receiving, from the first UE, a request to apply an offset to the discontinuous transmission configuration based at least in part on the transmitting of the first radio resource control connection reconfiguration message to the first UE.

Aspect 34: The method of any of aspects 20 through 33, further comprising: transmitting a data packet to the first UE using the sidelink connection; receiving, from the first UE, acknowledgment feedback indicating a negative acknowledgement or no acknowledgement; retransmitting, based at least in part on the received acknowledgement feedback, the data packet to the first UE using the sidelink connection; and receiving a radio resource control connection reconfiguration message from the first UE at least in part in response to the retransmission of the data packet.

Aspect 35: The method of any of aspects 20 through 34, further comprising: transmitting, to the first UE using the sidelink connection, a first radio resource control connection reconfiguration message and at least a portion of a data packet; and receiving a second radio resource control connection reconfiguration message from the first UE based at least in part on the first radio resource control connection reconfiguration message or the at least a portion of the data packet.

Aspect 36: An apparatus for wireless communications at a first UE, comprising a processor; memory coupled with the processor; and instructions stored in the memory and executable by the processor to cause the apparatus to perform a method of any of aspects 1 through 19.

Aspect 37: An apparatus for wireless communications at a first UE, comprising at least one means for performing a method of any of aspects 1 through 19.

Aspect 38: A non-transitory computer-readable medium storing code for wireless communications at a first UE, the code comprising instructions executable by a processor to perform a method of any of aspects 1 through 19.

Aspect 39: An apparatus for wireless communications at a second UE, comprising a processor; memory coupled with the processor; and instructions stored in the memory and executable by the processor to cause the apparatus to perform a method of any of aspects 20 through 35.

Aspect 40: An apparatus for wireless communications at a second UE, comprising at least one means for performing a method of any of aspects 20 through 35.

Aspect 41: A non-transitory computer-readable medium storing code for wireless communications at a second UE, the code comprising instructions executable by a processor to perform a method of any of aspects 20 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, from a second UE, a discontinuous transmission configuration for a sidelink connection between the first UE and the second UE;
   determining, based at least in part on the received discontinuous transmission configuration, a set of receive beams for discontinuous reception by the first UE for the sidelink connection; and
   transmitting, to the second UE, a discontinuous reception configuration that indicates the determined set of receive beams for discontinuous reception for the sidelink connection.

2. The method of claim 1, wherein transmitting the discontinuous reception configuration further comprises:
   transmitting an indication of at least one beam of the set of receive beams.

3. The method of claim 1, wherein transmitting the discontinuous reception configuration further comprises:
   transmitting an indication of time resources, or frequency resources, or both, corresponding to one or more receive beams of the set of receive beams.

4. The method of claim 3, wherein transmitting the indication of the time resources, or the frequency resources, or both comprises:
   transmitting, for a set of cycles of the discontinuous reception, the indication of time resources during which the first UE is to receive using each respective receive beam of the set of receive beams.

5. The method of claim 1, further comprising:
   attempting to receive, on the determined set of receive beams over a respective set of occasions during a cycle of the discontinuous reception, a transmission from the second UE; and
   receiving, on a receive beam of the set of receive beams, the transmission from the second UE during one of the set of occasions corresponding to the receive beam.

6. The method of claim 1, wherein the discontinuous reception configuration is transmitted to the second UE during a discontinuous transmission occasion indicated in the received discontinuous transmission configuration.

7. The method of claim 1, wherein the discontinuous reception configuration is transmitted to the second UE during a discontinuous reception on duration of the second UE.

8. The method of claim 1, further comprising:
   transmitting, to the second UE, a plurality of discontinuous reception configurations, including the discontinuous reception configuration, wherein each of the plurality of discontinuous reception configurations includes a receive beam configuration that the first UE is to use during a single discontinuous reception ON duration of the second UE.

9. The method of claim 1, further comprising:
   assigning, to the second UE, a first index that corresponds to a receive beam configuration of the discontinuous reception configuration, wherein the discontinuous reception configuration comprises the receive beam configuration and the first assigned index.

10. The method of claim 9, further comprising:
    identifying a plurality of receive beams the first UE is configured to form; and
    determining to receive transmissions from the second UE using a first receive beam and a second receive beam of the plurality of receive beams, wherein the receive beam configuration indicates the first receive beam and the second receive beam.

11. The method of claim 9, wherein the first assigned index is indicated for an entire discontinuous reception ON duration.

12. The method of claim 9, wherein the first assigned index is indicated for a first duration of a discontinuous reception ON duration and a second index is indicated for a second duration of the discontinuous reception ON duration, the second index to a second receive beam configuration of the discontinuous reception configuration.

13. The method of claim 9, further comprising:
    assigning, to the second UE, a second index that corresponds to a second receive beam configuration of the discontinuous reception configuration, wherein the discontinuous reception configuration comprises the receive beam configuration, the first assigned index, and the second assigned index, and wherein the second UE may reestablish a connection with the first UE using the first assigned index or the second assigned index; and
    indicating to the second UE that the second assigned index comprises a degradation in quality of service in relation to the first assigned index.

14. The method of claim 1, wherein the discontinuous reception configuration comprises an indication of a discontinuous reception period, or a frame offset, or a slot offset, or a discontinuous reception ON duration, or an index to a receive beam configuration of the discontinuous reception configuration that the first UE selects to use during the discontinuous reception ON duration, or a combination thereof.

15. The method of claim 1, further comprising:
receiving, from the second UE over the sidelink connection, a first radio resource control connection reconfiguration message, wherein the first radio resource control connection reconfiguration message comprises the discontinuous transmission configuration; and
transmitting, to the second UE, a second radio resource control connection reconfiguration message based at least in part on the first radio resource control connection reconfiguration message from the second UE, the second radio resource control connection reconfiguration message comprising a request to apply an offset to the discontinuous transmission configuration.

16. A method for wireless communications at a second user equipment (UE), comprising:
transmitting, to a first UE, a discontinuous transmission configuration for a sidelink connection between the first UE and the second UE;
receiving, from the first UE, a discontinuous reception configuration for the sidelink connection that indicates a set of receive beams for discontinuous reception by the first UE for the sidelink connection based at least in part on the transmitted discontinuous transmission configuration; and
transmitting, to the first UE using the sidelink connection, signaling according to the transmitted discontinuous transmission configuration and based at least in part on the received discontinuous reception configuration.

17. The method of claim 16, further comprising:
identifying a transmission beam of the second UE corresponding to a receive beam of the first UE that is indicated in the discontinuous reception configuration, the signaling transmitted on the identified transmission beam; and
determining, from the discontinuous reception configuration, time resources, or frequency resources, or both, corresponding to one or more receive beams of the set of receive beams.

18. The method of claim 16, wherein the discontinuous reception configuration is received during a discontinuous transmission occasion indicated in the transmitted discontinuous transmission configuration.

19. The method of claim 16, wherein the discontinuous reception configuration is received during a discontinuous reception ON duration of the second UE.

20. The method of claim 16, further comprising:
receiving, from the first UE, a plurality of discontinuous reception configurations, including the discontinuous reception configuration, wherein each of the plurality of discontinuous reception configurations includes a receive beam configuration that the first UE is to use during a single discontinuous reception on duration of the second UE.

21. The method of claim 16, further comprising:
transmitting, to the first UE using the sidelink connection, a first radio resource control connection reconfiguration message, wherein the first radio resource control connection reconfiguration message comprises the discontinuous transmission configuration; and
receiving, from the first UE, a second radio resource control connection reconfiguration message based at least in part on the transmitting of the first radio resource control connection reconfiguration message to the first UE, the second radio resource control connection reconfiguration message comprising a request to apply an offset to the discontinuous transmission configuration.

22. The method of claim 16, further comprising:
transmitting a first data packet to the first UE using the sidelink connection;
receiving, from the first UE, acknowledgment feedback indicating a negative acknowledgment or no acknowledgment;
retransmitting, based at least in part on the received acknowledgment feedback, the first data packet to the first UE using the sidelink connection;
receiving a radio resource control connection reconfiguration message from the first UE at least in part in response to the retransmission of the first data packet;
transmitting, to the first UE using the sidelink connection, a third radio resource control connection reconfiguration message and at least a portion of a second data packet; and
receiving a fourth radio resource control connection reconfiguration message from the first UE based at least in part on the third radio resource control connection reconfiguration message or the portion of the second data packet.

23. An apparatus for wireless communications at a first user equipment (UE), comprising:
one or more processors,
memory coupled with the one or more processors; and
instructions stored in the memory and executable by the one or more processors to cause the apparatus to:
receive, from a second UE, a discontinuous transmission configuration for a sidelink connection between the first UE and the second UE;
determine, based at least in part on the received discontinuous transmission configuration, a set of receive beams for discontinuous reception by the first UE for the sidelink connection; and
transmit, to the second UE, a discontinuous reception configuration that indicates the determined set of receive beams for discontinuous reception for the sidelink connection.

24. The apparatus of claim 23, wherein the instructions to transmit the discontinuous reception configuration further are executable by the one or more processors to cause the apparatus to:
transmit an indication of at least one beam of the set of receive beams.

25. The apparatus of claim 23, wherein the instructions to transmit the discontinuous reception configuration further are executable by the one or more processors to cause the apparatus to:
transmit an indication of time resources, or frequency resources, or both, corresponding to one or more receive beams of the set of receive beams.

26. The apparatus of claim 23, wherein the instructions are further executable by the one or more processors to cause the apparatus to:
attempt to receive, on the determined set of receive beams over a respective set of occasions during a cycle of the discontinuous reception, a transmission from the second UE; and
receive, on a receive beam of the set of receive beams, the transmission from the second UE during one of the set of occasions corresponding to the receive beam.

27. The apparatus of claim 23, wherein the discontinuous reception configuration is transmitted to the second UE during a discontinuous transmission occasion indicated in the received discontinuous transmission configuration, or during a discontinuous reception ON duration of the second UE.

28. The apparatus of claim 23, wherein the instructions are further executable by the one or more processors to cause the apparatus to:
   transmit, to the second UE, a plurality of discontinuous reception configurations, including the discontinuous reception configuration, wherein each of the plurality of discontinuous reception configurations includes a receive beam configuration that the first UE is to use during a single discontinuous reception on duration of the second UE.

29. The apparatus of claim 23, wherein the instructions are further executable by the one or more processors to cause the apparatus to:
   assign, to the second UE, a first index that corresponds to a receive beam configuration of the discontinuous reception configuration, wherein the discontinuous reception configuration comprises the receive beam configuration and the first assigned index.

30. An apparatus for wireless communications at a second user equipment (UE), comprising:
   one or more processors,
   memory coupled with the one or more processors; and
   instructions stored in the memory and executable by the one or more processors to cause the apparatus to:
   transmit, to a first UE, a discontinuous transmission configuration for a sidelink connection between the first UE and the second UE;
   receive, from the first UE, a discontinuous reception configuration for the sidelink connection that indicates a set of receive beams for discontinuous reception by the first UE for the sidelink connection based at least in part on the transmitted discontinuous transmission configuration; and
   transmit, to the first UE using the sidelink connection, signaling according to the transmitted discontinuous transmission configuration and based at least in part on the received discontinuous reception configuration.

* * * * *